(12) United States Patent
Ma et al.

(10) Patent No.: US 7,951,449 B2
(45) Date of Patent: May 31, 2011

(54) POLYESTER CORE MATERIALS AND STRUCTURAL SANDWICH COMPOSITES THEREOF

(76) Inventors: Wenguang Ma, Township of Washington, NJ (US); Kurt Feichtinger, Warwick, NY (US)

( * ) Notice: Subject to any disclaimer, the term of this patent is extended or adjusted under 35 U.S.C. 154(b) by 1648 days.

(21) Appl. No.: 10/183,841

(22) Filed: Jun. 27, 2002

(65) Prior Publication Data

US 2004/0001946 A1 Jan. 1, 2004

(51) Int. Cl.
*B32B 5/20* (2006.01)
*B32B 3/26* (2006.01)

(52) U.S. Cl. ............... 428/318.8; 428/317.9; 428/319.1; 428/319.3; 428/319.7; 428/316.6

(58) Field of Classification Search ............... 428/317.9, 428/319.3, 319.7, 310.5, 319.1, 316.6, 318.8, 428/480

See application file for complete search history.

(56) References Cited

U.S. PATENT DOCUMENTS

| | | | |
|---|---|---|---|
| 3,413,387 A | 11/1968 | Ohsol | |
| 3,467,570 A | 9/1969 | Baxter et al. | |
| 3,573,152 A | 3/1971 | Wiley et al. | |
| 3,674,719 A | 7/1972 | Jenkins | |
| 3,720,572 A * | 3/1973 | Soda et al. | 428/218 |
| 3,723,586 A | 3/1973 | Foster et al. | |
| 3,830,604 A | 8/1974 | Korpela | |
| 3,839,268 A * | 10/1974 | Kilian | 523/346 |
| 3,857,914 A | 12/1974 | Aishima et al. | |
| 3,861,977 A | 1/1975 | Wiley | |
| 3,954,365 A | 5/1976 | Barth et al. | |
| 3,954,555 A * | 5/1976 | Kole et al. | 162/136 |
| 3,954,928 A | 5/1976 | Omori et al. | |
| 3,980,513 A | 9/1976 | Omori et al. | |
| 3,993,721 A | 11/1976 | Soda et al. | |
| 4,032,275 A | 6/1977 | Schwab et al. | |
| 4,073,842 A | 2/1978 | Smith | |
| 4,074,960 A | 2/1978 | Dockray et al. | |
| 4,192,839 A | 3/1980 | Hayashi et al. | |
| 4,221,621 A | 9/1980 | Seki et al. | |
| 4,224,264 A | 9/1980 | Ort et al. | |
| 4,284,596 A | 8/1981 | Inokuchi et al. | |
| 4,312,960 A | 1/1982 | Ort et al. | |
| 4,361,453 A | 11/1982 | Gagliani et al. | |
| 4,369,261 A | 1/1983 | Gagliani et al. | |
| 4,394,461 A | 7/1983 | Stott | |
| 4,401,612 A | 8/1983 | Nehmey et al. | |

(Continued)

FOREIGN PATENT DOCUMENTS

DE 2116940 8/1972

(Continued)

OTHER PUBLICATIONS

International Search Report of International Application No. PCT/US03/29096 dated May 10, 2004.

(Continued)

*Primary Examiner* — Hai Vo
(74) *Attorney, Agent, or Firm* — RatnerPrestia

(57) ABSTRACT

High-strength, chemically and thermally stable, closed-cell foams, useful as structural core materials in sandwich composites. The core materials of the invention display anisotropic properties. The core materials of the invention are amenable to vacuum-mediated resin bonding to composite skins to provide lightweight, high-strength structural sandwiches suitable for use in a variety of applications, such as marine applications, construction, aviation, rapid transit, and recreational vehicles.

10 Claims, 10 Drawing Sheets

U.S. PATENT DOCUMENTS

| | | |
|---|---|---|
| 4,409,165 A | 10/1983 | Kim |
| 4,419,309 A | 12/1983 | Krutchen |
| 4,431,752 A | 2/1984 | Oswitch |
| 4,438,058 A | 3/1984 | Tanaka |
| 4,438,223 A | 3/1984 | Hunter |
| 4,440,704 A | 4/1984 | Bussey, Jr. |
| 4,440,876 A | 4/1984 | Mazzola et al. |
| 4,454,087 A | 6/1984 | Hayashi et al. |
| 4,456,571 A | 6/1984 | Johnson |
| 4,462,947 A | 7/1984 | Huggard |
| 4,464,484 A | 8/1984 | Yoshimura et al. |
| 4,465,649 A | 8/1984 | Johnson |
| 4,465,792 A | 8/1984 | Carr et al. |
| 4,469,651 A | 9/1984 | Hahn et al. |
| 4,470,938 A | 9/1984 | Johnson |
| 4,479,914 A | 10/1984 | Baumrucker |
| 4,486,369 A | 12/1984 | Schafler et al. |
| 4,491,554 A | 1/1985 | Hamel et al. |
| 4,508,669 A | 4/1985 | Iwai et al. |
| 4,520,137 A | 5/1985 | Hamel et al. |
| 4,522,954 A | 6/1985 | Ive |
| 4,525,440 A | 6/1985 | Barnette et al. |
| 4,525,485 A | 6/1985 | Maeda et al. |
| 4,532,094 A | 7/1985 | Wu et al. |
| 4,536,427 A | 8/1985 | Kohn |
| 4,548,775 A | 10/1985 | Hayashi et al. |
| 4,550,123 A | 10/1985 | Lopatin et al. |
| 4,562,022 A | 12/1985 | Li et al. |
| 4,579,874 A | 4/1986 | Krutchen |
| 4,579,878 A | 4/1986 | Krutchen et al. |
| 4,600,727 A | 7/1986 | Pastorino |
| 4,606,873 A | 8/1986 | Biglione et al. |
| 4,613,627 A | 9/1986 | Sherman et al. |
| 4,665,105 A | 5/1987 | Krutchen et al. |
| 4,693,856 A | 9/1987 | Rubens et al. |
| 4,728,472 A | 3/1988 | Windley et al. |
| 4,730,009 A | 3/1988 | Soredal |
| 4,753,762 A | 6/1988 | Li et al. |
| 4,755,408 A | 7/1988 | Noel |
| 4,801,484 A | 1/1989 | Yao et al. |
| 4,810,440 A | 3/1989 | Yoshida et al. |
| 4,824,720 A | 4/1989 | Malone |
| 4,837,060 A | 6/1989 | Bambara et al. |
| 4,843,109 A | 6/1989 | Bailey et al. |
| 4,858,629 A | 8/1989 | Cundari |
| 4,865,786 A | 9/1989 | Shibukawa et al. |
| 4,879,078 A | 11/1989 | Antoon, Jr. |
| 4,917,845 A | 4/1990 | Cohn |
| 4,923,654 A | 5/1990 | Freeland |
| 4,942,092 A | 7/1990 | Takabayashi et al. |
| 4,980,389 A | 12/1990 | Hill et al. |
| 4,990,542 A | 2/1991 | Motani et al. |
| 5,000,991 A | 3/1991 | Hayashi et al. |
| 5,023,009 A | 6/1991 | Merchant |
| 5,023,010 A | 6/1991 | Merchant |
| 5,064,559 A | 11/1991 | Merchant et al. |
| 5,071,884 A | 12/1991 | Malone |
| 5,080,823 A | 1/1992 | Arnaud et al. |
| 5,082,608 A | 1/1992 | Karabedian et al. |
| 5,086,083 A | 2/1992 | Franklin et al. |
| 5,089,187 A | 2/1992 | Aptel et al. |
| 5,089,193 A | 2/1992 | Behrens et al. |
| 5,096,638 A | 3/1992 | Meyke |
| 5,098,595 A | 3/1992 | Merchant |
| 5,100,572 A | 3/1992 | Merchant |
| 5,109,029 A | 4/1992 | Malone |
| 5,122,316 A | 6/1992 | Saatchi et al. |
| 5,124,095 A | 6/1992 | Gianni et al. |
| 5,124,097 A | 6/1992 | Malone |
| 5,124,098 A | 6/1992 | Vischer |
| 5,128,079 A | 7/1992 | Damle et al. |
| 5,133,913 A | 7/1992 | Miyakawa et al. |
| 5,134,028 A | 7/1992 | Hayashi et al. |
| 5,140,052 A | 8/1992 | Franklin |
| 5,141,530 A | 8/1992 | Jensvold et al. |
| 5,151,229 A | 9/1992 | Burns |
| 5,160,674 A | 11/1992 | Colton et al. |
| 5,182,040 A | 1/1993 | Bartlett et al. |
| 5,185,111 A | 2/1993 | Lazar |
| 5,188,748 A | 2/1993 | Arnaud et al. |
| 5,202,069 A | 4/1993 | Pontiff |
| 5,206,082 A | 4/1993 | Malone |
| 5,221,492 A | 6/1993 | Bartlett |
| 5,223,545 A | 6/1993 | Kumar |
| 5,229,432 A | 7/1993 | Muschiatti |
| 5,234,640 A | 8/1993 | Amano et al. |
| 5,234,963 A | 8/1993 | Garcia et al. |
| 5,240,634 A | 8/1993 | Merchant |
| 5,246,976 A | 9/1993 | Pontiff |
| 5,250,579 A | 10/1993 | Smits et al. |
| 5,254,400 A | 10/1993 | Bonner, Jr. et al. |
| 5,262,444 A | 11/1993 | Rusincovitch et al. |
| 5,266,251 A | 11/1993 | Jensen |
| 5,271,886 A | 12/1993 | Collom et al. |
| 5,277,852 A | 1/1994 | Spydevold |
| 5,278,196 A | 1/1994 | Robin et al. |
| 5,288,764 A | 2/1994 | Rotter et al. |
| 5,310,513 A | 5/1994 | Yamamoto et al. |
| 5,314,925 A | 5/1994 | Burnell et al. |
| 5,314,927 A | 5/1994 | Kondo et al. |
| 5,317,033 A | 5/1994 | Motani et al. |
| 5,317,044 A | 5/1994 | Mooney et al. |
| 5,321,052 A | 6/1994 | Taka et al. |
| 5,328,650 A | 7/1994 | Ingram et al. |
| 5,334,336 A | 8/1994 | Franz et al. |
| 5,348,985 A | 9/1994 | Pearce et al. |
| 5,358,675 A | 10/1994 | Campbell et al. |
| 5,360,829 A | 11/1994 | Kawabe et al. |
| 5,362,763 A | 11/1994 | Al Ghatta et al. |
| 5,368,794 A | 11/1994 | Ou |
| 5,373,026 A | 12/1994 | Bartz et al. |
| 5,384,203 A | 1/1995 | Apfel |
| 5,387,617 A | 2/1995 | Hedstrand et al. |
| 5,389,319 A | 2/1995 | Hayashi et al. |
| 5,391,582 A | 2/1995 | Muschiatti et al. |
| 5,391,694 A | 2/1995 | Duh et al. |
| 5,397,807 A | 3/1995 | Hitchcock et al. |
| 5,399,595 A | 3/1995 | Sublett et al. |
| 5,405,563 A | 4/1995 | Hayashi et al. |
| 5,407,966 A | 4/1995 | Ebert et al. |
| 5,409,962 A | 4/1995 | Bartlett et al. |
| 5,411,683 A | 5/1995 | Shah |
| 5,411,689 A | 5/1995 | Lee et al. |
| 5,422,381 A | 6/1995 | Al Ghatta et al. |
| 5,424,016 A | 6/1995 | Kolosowski |
| 5,458,832 A | 10/1995 | Kabumoto et al. |
| 5,468,430 A | 11/1995 | Ekiner et al. |
| 5,474,695 A | 12/1995 | Macaudiere et al. |
| 5,475,035 A | 12/1995 | Park et al. |
| 5,475,037 A | 12/1995 | Park et al. |
| 5,482,977 A | 1/1996 | McConnell et al. |
| 5,500,173 A | 3/1996 | Dugan |
| 5,507,982 A | 4/1996 | Brotz |
| 5,508,316 A | 4/1996 | Nakamura et al. |
| 5,514,192 A | 5/1996 | Grigsby, Jr. |
| 5,523,036 A | 6/1996 | Luke et al. |
| 5,527,573 A | 6/1996 | Park et al. |
| 5,531,944 A | 7/1996 | Frisch |
| 5,565,497 A | 10/1996 | Godbey et al. |
| 5,567,370 A | 10/1996 | Deseke et al. |
| 5,569,421 A | 10/1996 | Grone |
| 5,580,503 A | 12/1996 | Hall, III et al. |
| 5,601,753 A | 2/1997 | Omure et al. |
| 5,603,873 A | 2/1997 | Ingram et al. |
| 5,605,937 A | 2/1997 | Knaus |
| 5,618,853 A | 4/1997 | Vonken et al. |
| 5,648,017 A | 7/1997 | Bartlett et al. |
| 5,667,740 A | 9/1997 | Spydevold |
| 5,670,102 A | 9/1997 | Perman et al. |
| 5,679,295 A | 10/1997 | Harfmann |
| 5,681,501 A | 10/1997 | Minor |
| 5,681,865 A | 10/1997 | Harfmann |
| 5,696,176 A | 12/1997 | Khemani et al. |
| 5,700,407 A | 12/1997 | Branger |
| 5,707,571 A | 1/1998 | Reedy |
| 5,707,573 A | 1/1998 | Biesenberger et al. |
| 5,710,186 A | 1/1998 | Chaudhary |

| | | |
|---|---|---|
| 5,710,189 A | 1/1998 | Brandt |
| 5,723,510 A | 3/1998 | Kabumoto et al. |
| 5,730,894 A | 3/1998 | Minor |
| 5,733,472 A | 3/1998 | Minor et al. |
| 5,753,157 A | 5/1998 | Hall, III et al. |
| 5,753,161 A | 5/1998 | Lightle et al. |
| 5,762,818 A | 6/1998 | Minor et al. |
| 5,776,990 A | 7/1998 | Hedrick et al. |
| 5,780,539 A | 7/1998 | Tung |
| 5,783,610 A | 7/1998 | Fukushima et al. |
| 5,786,398 A | 7/1998 | Hulls et al. |
| 5,798,063 A | 8/1998 | Bender et al. |
| 5,798,160 A | 8/1998 | Kohn |
| 5,804,112 A | 9/1998 | Greene |
| 5,811,038 A | 9/1998 | Mitchell |
| 5,811,164 A | 9/1998 | Mitchell |
| 5,823,669 A | 10/1998 | Jones |
| 5,830,393 A | 11/1998 | Nishikawa et al. |
| 5,833,782 A | 11/1998 | Crane et al. |
| 5,833,894 A | 11/1998 | Lanzani et al. |
| 5,833,896 A | 11/1998 | Jacobs et al. |
| 5,840,212 A | 11/1998 | Doerge |
| 5,847,012 A | 12/1998 | Shalaby et al. |
| 5,847,017 A | 12/1998 | Brandt |
| 5,854,294 A | 12/1998 | Hirosawa et al. |
| 5,866,053 A | 2/1999 | Park et al. |
| 5,889,064 A | 3/1999 | Herrmann |
| 5,902,529 A | 5/1999 | Ishikawa et al. |
| 5,904,972 A | 5/1999 | Tunis, III et al. |
| 5,912,279 A | 6/1999 | Hammel et al. |
| 5,922,782 A | 7/1999 | Khemani |
| 5,925,450 A | 7/1999 | Karabedian et al. |
| 5,938,874 A | 8/1999 | Palomo et al. |
| 5,955,511 A | 9/1999 | Handa et al. |
| 5,958,164 A * | 9/1999 | Ishiwatari et al. ............... 156/78 |
| 5,977,195 A | 11/1999 | Craig et al. |
| 5,980,795 A | 11/1999 | Klotzer et al. |
| 5,985,190 A | 11/1999 | Harfmann |
| 5,994,418 A | 11/1999 | Weiser et al. |
| 6,005,013 A | 12/1999 | Suh et al. |
| 6,005,014 A | 12/1999 | Blackwell et al. |
| 6,007,890 A * | 12/1999 | DeBlander ..................... 428/72 |
| 6,013,194 A | 1/2000 | Minor |
| 6,015,516 A | 1/2000 | Chung et al. |
| 6,020,393 A | 2/2000 | Khemani |
| 6,031,011 A | 2/2000 | Tapscott |
| 6,033,748 A | 3/2000 | Dunning et al. |
| 6,051,174 A | 4/2000 | Park et al. |
| 6,054,500 A | 4/2000 | Ghatta et al. |
| 6,057,379 A | 5/2000 | Choi et al. |
| 6,063,316 A | 5/2000 | Harfmann |
| 6,066,680 A | 5/2000 | Cope |
| 6,071,580 A | 6/2000 | Bland et al. |
| 6,080,798 A | 6/2000 | Handa et al. |
| 6,080,799 A | 6/2000 | Kruecke et al. |
| 6,093,350 A | 7/2000 | Sadinski |
| 6,093,750 A | 7/2000 | Craig et al. |
| 6,103,152 A | 8/2000 | Gehlsen et al. |
| 6,110,983 A | 8/2000 | Tokoro et al. |
| 6,130,261 A | 10/2000 | Harfmann |
| 6,153,293 A | 11/2000 | Dahl et al. |
| 6,159,414 A * | 12/2000 | Tunis et al. ................... 264/510 |
| 6,165,308 A | 12/2000 | Chen et al. |
| 6,169,122 B1 | 1/2001 | Blizard et al. |
| 6,172,127 B1 | 1/2001 | Choi et al. |
| 6,172,128 B1 | 1/2001 | Lau et al. |
| 6,197,233 B1 | 3/2001 | Mason et al. |
| 6,210,788 B1 | 4/2001 | Cuypers |
| 6,213,540 B1 | 4/2001 | Tusim et al. |
| 6,228,897 B1 | 5/2001 | Daly et al. |
| 6,232,354 B1 | 5/2001 | Tan |
| 6,241,220 B1 | 6/2001 | Blackwell et al. |
| 6,258,864 B1 | 7/2001 | Dalton et al. |
| 6,284,810 B1 | 9/2001 | Burnham et al. |
| 6,291,539 B1 | 9/2001 | Kreiser et al. |
| 6,294,115 B1 | 9/2001 | Blizard et al. |
| 6,294,116 B1 | 9/2001 | Shih et al. |
| 6,306,320 B1 | 10/2001 | Flautt et al. |
| 6,306,921 B1 | 10/2001 | Al Ghatta et al. |
| 6,315,931 B1 | 11/2001 | Bruning et al. |
| 6,328,916 B1 | 12/2001 | Nishikawa et al. |
| 6,334,970 B1 | 1/2002 | Kuroda et al. |
| 6,339,109 B1 | 1/2002 | Day et al. |
| 6,342,173 B1 | 1/2002 | Harfmann |
| 6,361,724 B1 | 3/2002 | Maeda et al. |
| 6,844,055 B1 * | 1/2005 | Grinshpun et al. ........ 428/304.4 |
| 2001/0018121 A1 | 8/2001 | Okamoto et al. |
| 2001/0023510 A1 | 9/2001 | Masubuchi |
| 2001/0031794 A1 | 10/2001 | Yamamoto et al. |
| 2001/0033040 A1 | 10/2001 | Cardona et al. |
| 2001/0051693 A1 | 12/2001 | Seo et al. |
| 2002/0008076 A1 | 1/2002 | Bartholomew |
| 2002/0017734 A1 | 2/2002 | Sugihara et al. |
| 2002/0024165 A1 | 2/2002 | Xu |
| 2002/0036363 A1 | 3/2002 | Kuroda et al. |

FOREIGN PATENT DOCUMENTS

| | | |
|---|---|---|
| EP | 279668 | 8/1988 |
| JP | 407252724 A | 10/1995 |
| JP | 411152363 A | 6/1999 |
| JP | 411166066 A | 6/1999 |
| JP | 02000052397 A | 2/2000 |
| JP | 0200345019 A | 12/2000 |
| JP | 02001096599 A | 4/2001 |
| JP | 02001347535 A | 12/2001 |

OTHER PUBLICATIONS

International Search Report, Nov. 17, 2003.

* cited by examiner

POLYESTER CORE MATERIALS AND STRUCTURAL SANDWICH COMPOSITES THEREOF

1. FIELD OF THE INVENTION

The invention is directed to chemically and thermally-stable structural core materials comprising compressed foamed polyester strands and methods for their preparation. The invention is also directed to structural sandwich composites constructed from such core materials and methods for their preparation.

2. BACKGROUND OF THE INVENTION

Structural sandwich composites—which are sandwich-like arrangements of a relatively low-density core material bonded between comparatively thin, high-strength and high-stiffness skins—are used in a wide variety of applications that require lightweight, yet structurally strong materials. To name but a few applications, structural sandwich composites are used in boating, construction, aviation, rapid transit, and recreational vehicles. Structural sandwich composites are useful because of their high strength and low weight per unit area. When bonded between skins, the low-density core provides a large strength and stiffness enhancement over the skins alone, but adds only a comparatively small weight. To illustrate the benefits of structural sandwich composite construction, consider that dividing a material (e.g., aluminum or fiberglass) into two skins and bonding a core material that is twice the original material's thickness in between them, results in a composite having a stiffness 7 times greater and a strength 3.5 times greater than the original material's while having a density only 1.03 times that of the original material. ANDREW C. MARSHALL, COMPOSITE BASICS 3-1 (5th ed. 1998).

How well a sandwiched core material functions in real-world applications can be predicted from laboratory measurements of its compression strength and modulus, tensile strength and modulus, and shear strength and modulus.

The properties of the core material are of great importance. Desirable properties include high strength, low density, rigidity, high chemical and heat resistance, and low cost. The most common core materials are wood, honeycomb structures, and foams comprising both thermoplastic and thermosetting compositions. Wood core materials suffer from variations in properties and are susceptible to fungal decay, especially in marine use. Honeycomb cores are of an open structure, i.e., comprised of contiguous, connected, and/or interlocked cells, and are typically constructed from rigid materials, such as thermoplastics, fiberglass, aluminum, and stainless steel. While honeycomb-core materials provide strong, high-quality, chemically resistant composites, they are difficult to manufacture. The connected nature of the cells precludes composite manufacture by vacuum-mediated resin techniques because the vacuum draws the resin into the individual cells. Furthermore, honeycomb cores are not suitable for marine applications because a crack in the composite skin can lead to the entire composite filling with water. Closed-cell thermoplastic or thermosetting foams avoid some of these problems, but generally are thermally and chemically sensitive; thus, their composites cannot be used in certain higher-temperature applications. A further disadvantage of thermoplastic- or thermosetting-foam core materials is that certain resin-type adhesives can significantly degrade them, both chemically and via the heat evolved during the cure process.

Skins can be attached to core materials by a variety of methods. One of the most popular methods, because of the high shear strength of the resulting composite, is bonding the skins to the core with a resin (the resin-cure method). The resin-cure method provides structural sandwich composites with excellent skin-core adhesion and delamination resistance. In the resin-cure method, an uncured resin is applied to the contacting surfaces, the core and the skins are contacted, and bonding results upon resin cure. Often, a reinforcing material such as a glass-fiber fabric or mat is combined with the uncured resin to improve strength and stiffness in the resulting joint. During resin cure, substantial heat is generated.

Vacuum-bagging and vacuum-injection-molding techniques are used commercially to introduce the resin between the skins and suitable cores see, for example, U.S. Pat. No. 6,159,414 (issued May 18, 1999); U.S. Pat. No. 5,316,462 (issued May 31, 1994); and U.S. Pat. No. 5,834,082 (issued Nov. 10, 1998). In this process, vacuum is used to draw the uncured resin between the core and skin. Advantageously, the vacuum removes resin fumes as well as shields the uncured resin from air.

With some core materials, however, such as honeycomb structures, vacuum-mediated resin application is difficult or impossible. And unfortunately, in these cases, open-air resin application is proscribed because the hazardous resin fumes are not contained and resin curing can be inhibited by air and moisture. Thus, thermoplastic or thermosetting foams are ideal in that they do not suffer from the biodegradability of wood cores and are amenable to vacuum-mediated resin application. But a serious drawback with thermoplastic- or thermosetting-foam cores is that the heat evolved during resin cure and the chemically corrosive properties of the resin can degrade them, resulting in weaker composites.

Thermoplastic polyester resins, such as polyethylene terephthalate (PET) and polybutylene terephthalate (PBT) that have been pre-treated with branching agents (hereinafter "branched polyesters") yield closed-cell foams having excellent strength and mechanical properties, low density, and high chemical and thermal resistance. The branching agents, which have multiple chemical-reaction sites, function by chemically condensing two or more polyester chains ("branching"). This branching gives the pre-foam polyester melt viscoelastic properties more suitable for foaming, leading to higher quality foams. Polyester foams, prepared from branched polyesters, such as branched polyethylene terephthalate, have been disclosed in U.S. Pat. No. 5,000,991 (issued Mar. 19, 1991); U.S. Pat. No. 5,229,432 (issued Jul. 20, 1993); U.S. Pat. No. 5,340,846 (issued Aug. 23, 1994); U.S. Pat. No. 5,362,763 (issued Nov. 8, 1994); U.S. Pat. No. 5,422,381 (issued Jun. 6, 1995); U.S. Pat. No. 5,679,295 (Oct. 21, 1997); U.S. Pat. No. 5,681,865 (Oct. 28, 1997); U.S. Pat. No. 6,342,173 (issued Jan. 29, 2002), each of which eight patents are hereby incorporated by reference herein. These foams are closed-cell structures with low densities, excellent mechanical properties, and high thermal and chemical resistance. Regrettably, because the process used for their manufacture leads to irregular surfaces, such foams make mediocre to poor core materials. The irregular surfaces promote weak bonding to the composite skin and wide cell-size distribution and, therefore, poor mechanical properties. To explain more fully, polyesters are generally foamed by extruding a pressurized mixture of a branched-polyester melt and a volatile, organic expanding or "blowing agent" through an annular or slit die. Upon entering ambient pressure, the blowing agent evaporates and the polyester foams. This process suffers in that if the die opening size surpasses a critical limit, extruder pressure cannot be maintained. Furthermore, as the die opening is enlarged to the size required for use as a core material, blowing-agent evaporation throughout the material becomes non-uniform leading to erratic cell-size distribution, oversized cells, and an irregular surface.

Coalesced-strand polyester foams are more suitable as core materials because they can be produced in thicker size with a uniform distribution of small cells. Coalesced-strand polyester foams are disclosed in U.S. Pat. No. 5,475,037 (issued Dec. 12, 1995). Generally, coalesced-strand thermoplastic foams are prepared by melting a thermoplastic resin, mixing the melt with a blowing agent, and extruding the resulting gel through a multi-orifice die. The orifices are so arranged such that some contact between adjacent strands occurs during foaming, and the contacting strand surfaces adhere to one another resulting in a coalesced-strand structure. These strand foams, however, are not used as core materials. Tenacious, tough thermoplastic resins such as polypropylene or polyethylene which generally exhibit lower stiffness, may be advantageously used for some applications, such as shock absorbers (see, e.g., U.S. Pat. No. 6,213,540 (issued Apr. 10, 2001)) but they offer poor performance as composite core materials for which high strength and stiffness are desirable.

In view of the above, there is a need for low-density closed-cell core materials that are rigid, strong, chemically and thermally resistant, and amenable to vacuum-mediated resin application.

3. SUMMARY OF THE INVENTION

The invention provides high-strength, chemically and thermally stable, closed-cell foams, useful as core materials in composites. The core materials of the invention comprise multiple foamed polyester strands, compressed together (or shaped) to form a unitary, closed cell foam displaying anisotropic properties.

A further feature of core materials of the invention is that, although they are manufactured by extruding through a multi-orifice die, there are substantially no voids in between the strands (no inter-strand voids). This is a result of the special shaping process and shaping apparatus described in more detail herein. The shaping process can be adjusted to completely remove the strand appearance of the core material. That is, if the core material is cut perpendicular to the strand direction, strands are no longer visible to the human eye. The strands have coalesced to a degree wherein the core material appears to be completely unitary. Thus, to the human eye, the core materials of the invention appear identical to a conventional foam board manufactured by extruding through a single-orifice, standard slot die. However, the core materials of the invention display improved properties over conventional slot-die produced foam boards. And, in contrast to such conventional foam boards, the core materials of the invention are significantly anisotropic in character and have an unusual cell size distribution. The cell-size distribution of core materials of the invention defines a plurality of "discrete volumes", running parallel to the strand direction. These "discrete volumes" comprise an interior section running parallel to the strand direction and a "jacket" surrounding the "interior section of the discrete volume". The "interior section of the discrete volume" has closed cells of average cell size relatively larger than the average cell size of the cells in the surrounding "jacket". In other words, the average-cell diameter is smaller where the strands have intersected and merged than at the original strand's interior. This can be described as a pseudo honeycomb structure.

Because of their high thermal and chemical resistance, the core materials of the invention are amenable to vacuum-mediated resin bonding to composite skins to provide lightweight, high-strength, buoyant, and watertight structural sandwich composites suitable for use in a variety of applications, such as construction, boats, ships, and other marine applications, aviation, rapid transit, and recreational vehicles. In fact, the core materials of the invention are compatible with just about all resins, and can accept high molding temperatures and pressures. They can be processed with nearly all composite fabrication techniques including contact molding, vacuum bagging, resin infusion, autoclave, RTM, match metal molding, pre-preg and others.

In one embodiment, the invention is directed to a method for making a composite comprising: extruding a foamable gel comprising a blowing agent and a foamable polyester through a multi-orifice die to give a plurality of strands; foaming the strands to form a multi-stranded foamed article; shaping the multi-stranded foamed article to give a core material; and bonding the core material to one or more structural skins.

In another embodiment, the invention is directed to a composite comprising a foamed polyester core material bonded to one or more structural skins, wherein the core material comprises a plurality of discrete volumes, each discrete volume comprising an interior section and a corresponding jacket, wherein the average cell size in the interior section is larger than the average cell size in the jacket.

In still another embodiment, the invention relates to a composite comprising a foamed polyester core material bonded to one or more structural skins, wherein the core material comprises a plurality of foamed strands, wherein there are substantially no inter-strand voids.

In yet one more embodiment, the invention is directed to a composite comprising a foamed polyester core material bonded to one or more structural skins, wherein the core material is anisotropic.

In another embodiment, the invention relates to a core material comprising foamed polyester, wherein the foamed polyester comprises a plurality of discrete volumes, each discrete volume comprising an interior section and a corresponding jacket, wherein the average cell size in the interior section is larger than the average cell size in the jacket. Preferably, the core material is anisotropic.

4. BRIEF DESCRIPTION OF THE FIGURES

These and other features, aspects, and advantages of the present invention will become better understood with regard to the following description, appended claims, and accompanying drawings where:

Figure 5:
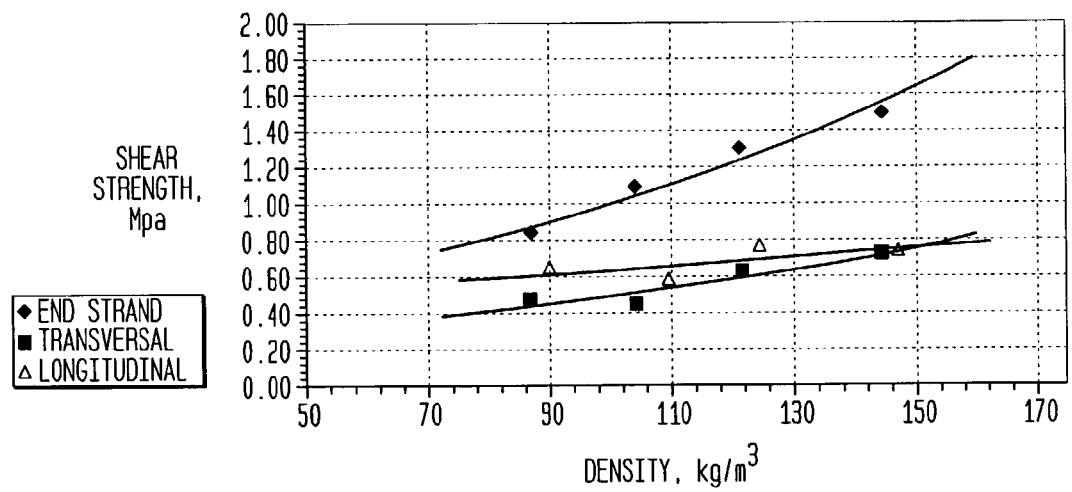
Figure 6:
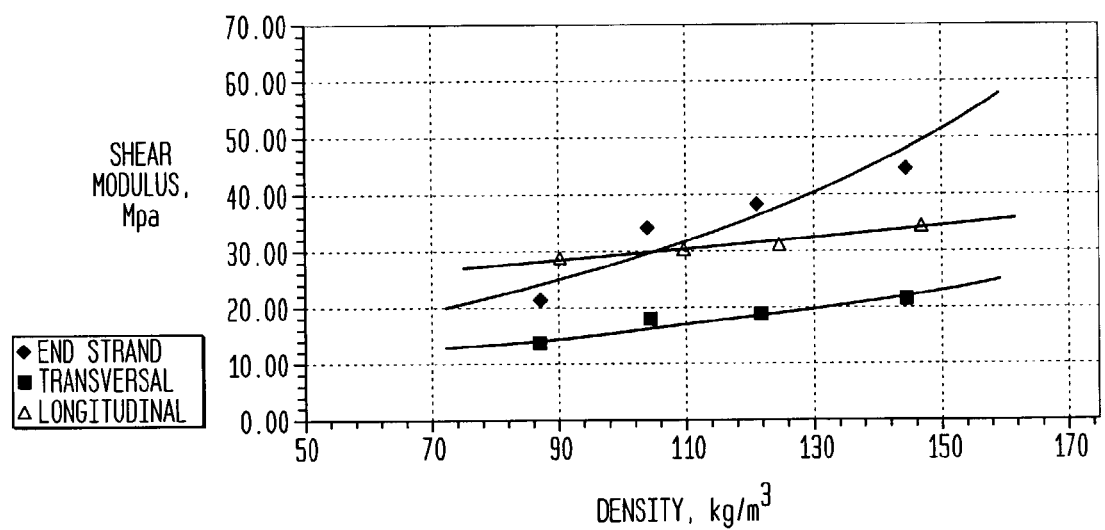
Figure 7:
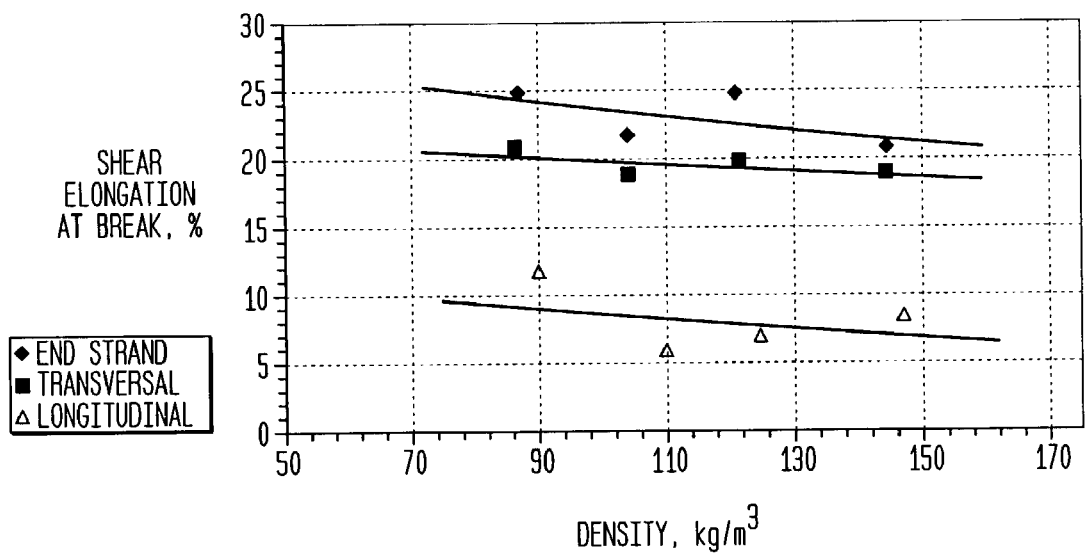
Figure 8:
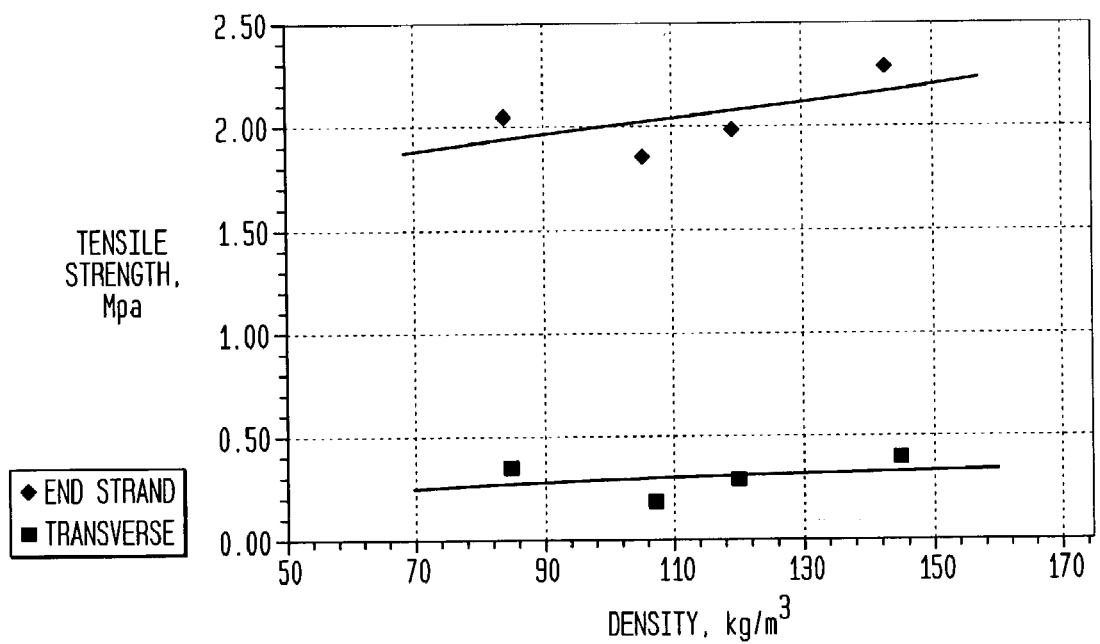
Figure 9:
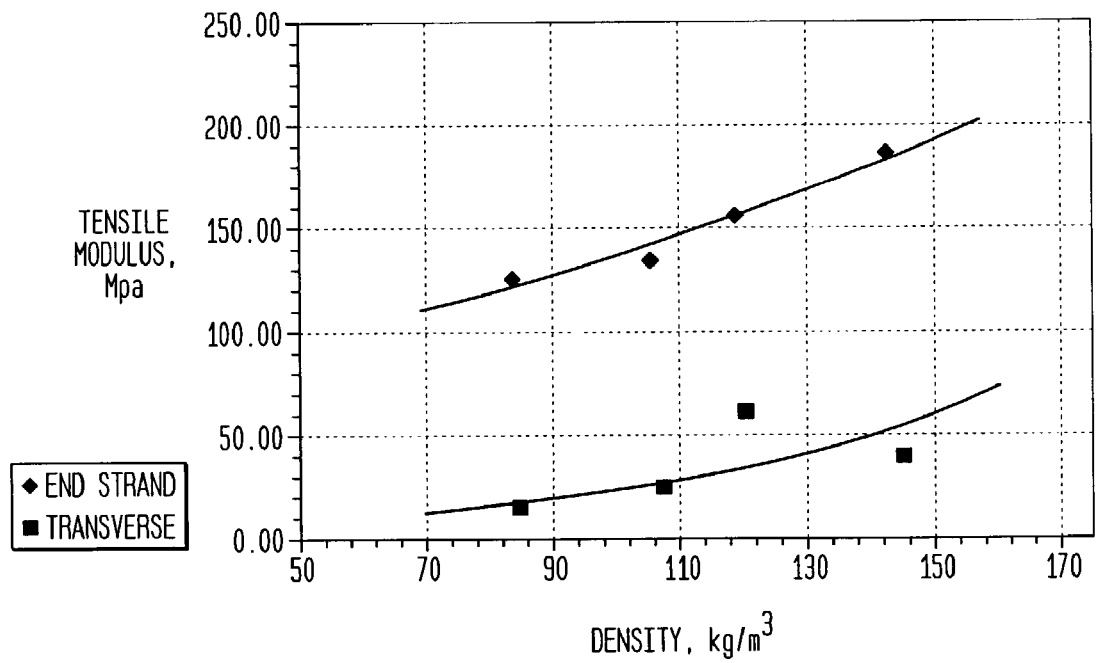
Figure 10:
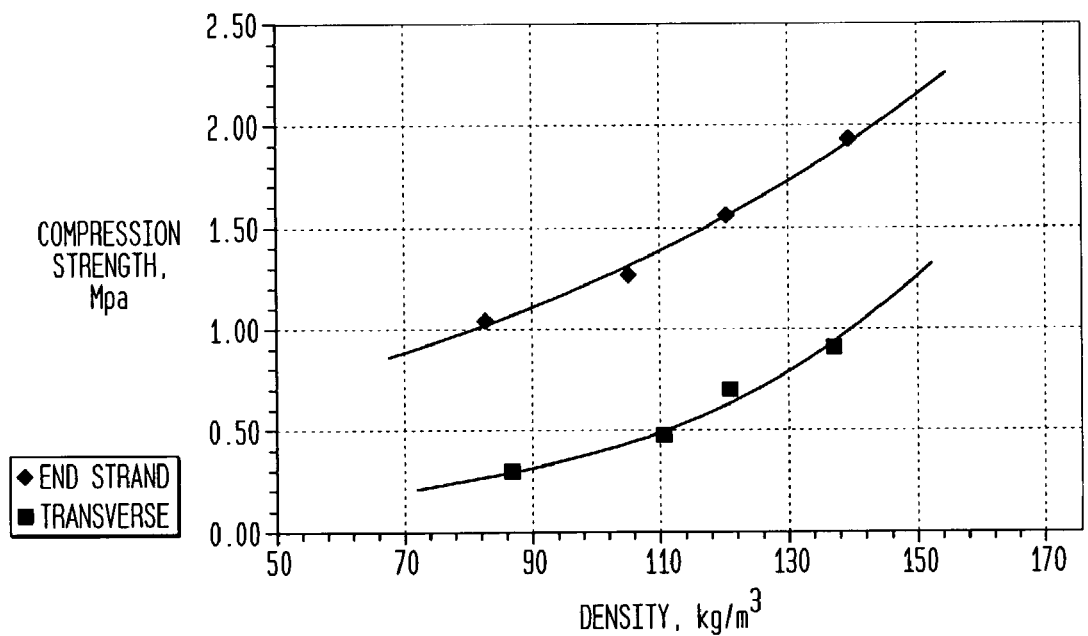
Figure 11:
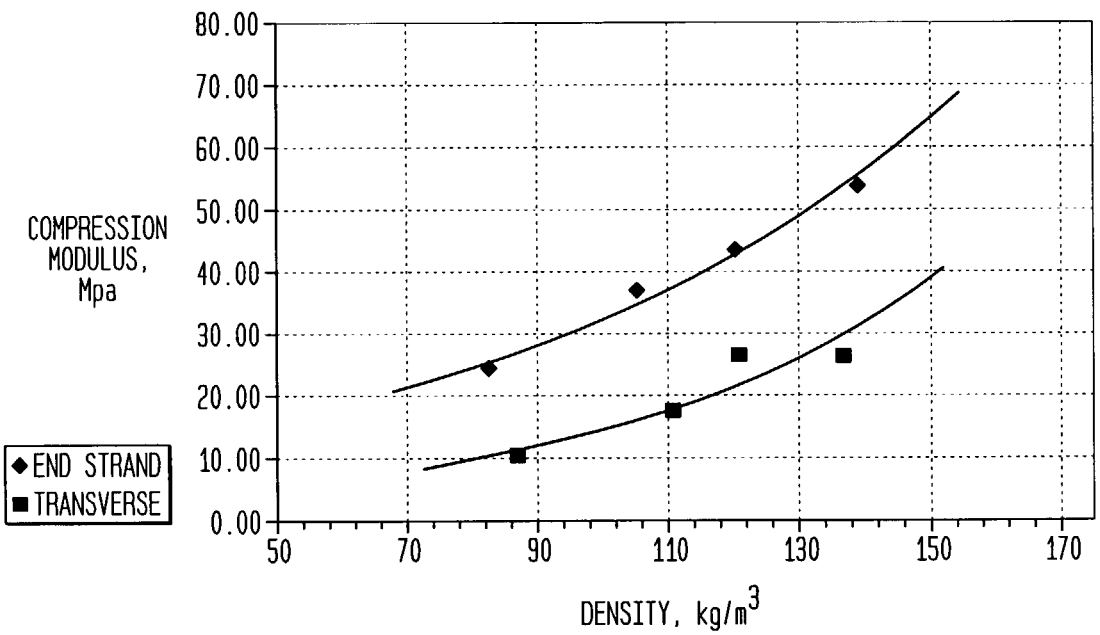
Figure 12:
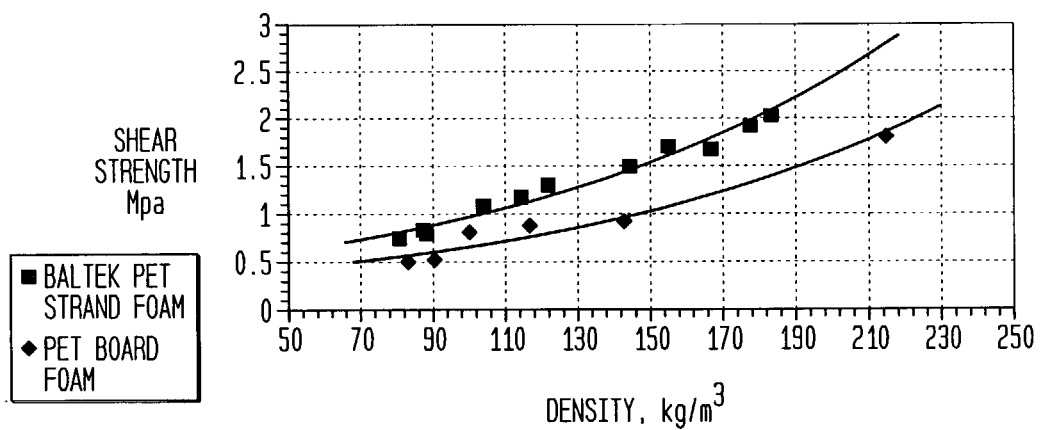
Figure 13:
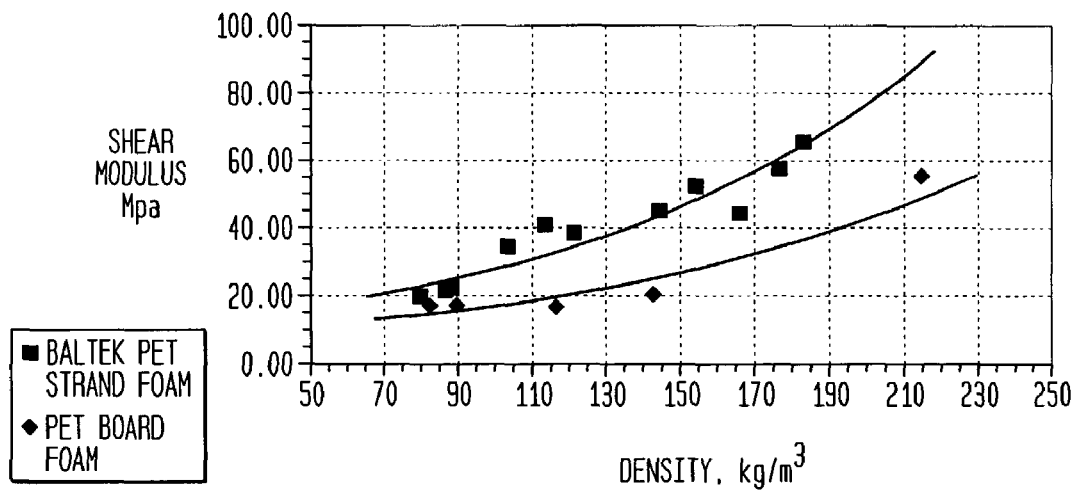
Figure 14:
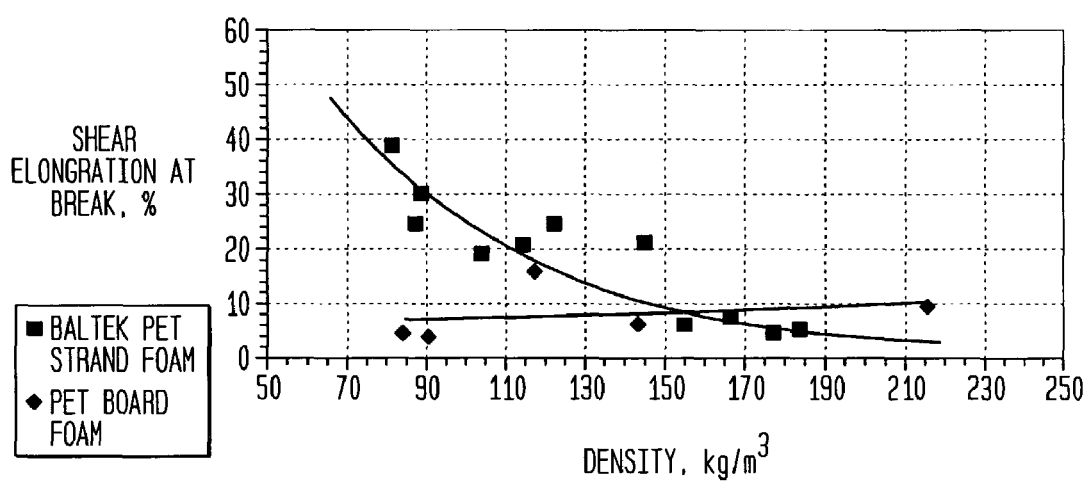

FIGS. 5, 6, and 7 are graph plots of shear strength versus density (FIG. 5); shear modulus versus density (FIG. 6); and shear elongation at break versus density (FIG. 7) conducted in a direction end-strand, transverse, and longitudinal to the strand direction respectively of PET core materials of the invention;

FIGS. 8 and 9 are graph plots of tensile strength versus density (FIG. 8) and tensile modulus versus density (FIG. 9)

of PET core materials of the invention conducted in a direction end-strand and transverse to the strand direction respectively;

FIGS. 10 and 11 are graph plots of compression strength versus density (FIG. 10) and compression modulus versus density (FIG. 11) of PET core materials of the invention conducted in a direction end-strand and transverse to the strand direction respectively; and FIGS. 12, 13, and 14 are graph plots comparing the properties of shear strength; shear modulus; and shear elongation at break, respectively, of PET core materials of the invention versus conventional, slot-die extruded PET foam boards over a density range.

5. DETAILED DESCRIPTION OF THE INVENTION

The core materials of the invention may be prepared as follows. A foamable polyester, of suitable melt rheology, is heated above its melt point to form a polyester melt. The heated mixture is pressurized in an extruder and a blowing agent is blended into the melt to form a foamable gel. During blowing-agent addition and mixing, the pressure is maintained above the blowing agent's equilibrium vapor pressure at the operating temperature of the foamable gel. The gel is cooled and extruded through a multi-orifice die of desired design. Upon entering ambient pressure, the blowing agent boils and expands thereby foaming the strands. As the strands foam, they coalesce resulting in multi-stranded polyester foam. At this point, the foam has voids or channels running parallel to the strands. The voids are removed by compressing the foam in a special shaping process. Temperatures, pressures, and extrusion rates will depend upon the specific polyester, additives, blowing agents, equipment, die design, and on the properties desired in the final foam product. The core materials of the invention may be bonded to skins to form composites by well-known methods in the art, such as vacuum-mediated resin application.

5.1 DEFINITIONS

5.1.1 Structural Sandwich Composite

As used herein, the phrase "structural sandwich composite" means an article comprising a core material integrally bonded to one or more structural skins. Preferably a "structural sandwich composite" means a sandwich-like article comprising a core material integrally bonded between structural skins. The phrase "Integrally bonded" means that the skin is bonded to the core material substantially throughout the skin's entire contact area. A "structural sandwich composite of the invention" means a structural sandwich composite comprising a core material of the invention. Examples of suitable structural skins include, but are not limited to, thermoplastic polymers and thermosetting polymers, optionally reinforced with glass fibers, metallic fibers, inorganic fibers, or carbon fibers; wood; inorganic materials, such as fiberglass; and metallic materials, such as aluminum and stainless steel and many others, which are well known to those of skill in the art.

5.1.2 Core Materials of the Invention

As used herein, the phrase "core materials of the invention" means a foamed article prepared by extruding a melt comprising a foamable polyester and one or more blowing agents through a multi-orifice die, according to the methods described more fully herein, to give a multi-stranded foamed core material. Preferably, the coalesced multi-stranded foamed core material is further compressed (via shaping) to remove substantially all the voids between the individual strands. Thus, the multi-stranded foamed core material is transformed via shaping into a unitary closed-cell structure, wherein certain foam-cell walls (those corresponding to the surface where the exterior of the strands were compressed together during shaping) are of increased (generally double) thickness over those of the strand interior. The strand density of the multi-stranded foamed core material prior to shaping will govern the relative number of cells having such increased thickness. Such a structure is referred to herein as a "compressed-strand structure" gives the core materials of the invention advantageous structural and mechanical properties over traditional foam core materials.

5.1.3 Pre-Shaped and Shaped Core Materials of the Invention

As used herein, the phrase "pre-shaped core material" means a "core material of the invention" prior to its being shaped by a shaper of the invention, which shaper and shaping process is more fully described in Section 5.3.2 below. In some cases, pre-shaped core materials of the invention may have gaps or air pockets between the strands. The shaping process, which results in a "shaped core material of the invention", compresses the strands thereby removing the gaps or air pockets. Preferably, core materials of the invention are shaped.

5.1.4 Strand Direction

As used herein, the phrase "strand direction" means the axis along which a core material of the invention was extruded during production. This is an important reference point since, in some cases, the strand character of core materials of the invention is not visible to strand compression and merger during the special shaping disclosed herein (see Section 5.3.2 below). The "strand direction" influences the anisotropic physical properties of core materials of the invention. For example, the core materials of the invention exhibit greater compressive strength in the "strand direction". This is discussed more fully in Section 5.4.2 below.

5.1.5 End Strand Direction in Composites of the Invention

The phrase "end-strand direction" is used in reference to composites of the invention wherein the composite's skins are bonded to a core material of the invention perpendicular to the strand direction. In such circumstances, the "end-strand direction" means a direction or axis perpendicular to the strand direction (therefore, also parallel to the composite skins).

5.1.6 Longitudinal Direction In Composites of the Invention

The phrase "longitudinal direction" is used in reference to composites of the invention wherein the composite's skins are bonded to a core material of the invention such that the skins are parallel to the strand direction. In such circumstances, the "longitudinal direction" means a direction or axis parallel to the strand direction.

5.1.7 Transverse Direction In Composites of the Invention

The phrase "transverse direction" is used in reference to composites of the invention wherein the composite's skins are bonded to a core material of the invention such that the skins are parallel to the strand direction. In such circumstances, the "transverse direction" means a direction or axis perpendicular to the strand direction.

5.1.8 Foamable Polyester

As used herein, the phrases "foamable polyester" or "foamable-polyester resin" mean any thermoplastic or thermoplastic mixture comprising polyester, a branched polyester, a polyester co-polymer, or a branch polyester co-polymer that can be effectively foamed to yield a core material of the invention.

5.1.9 Polyester Co-Polymer

As used herein, the phrase "polyester co-polymer" means a polyester prepared, according to well-known methods, by co-polymerizing an ester monomer and one or more other monomers.

5.1.10 Branched Polyester

As used herein, the phrase "branched polyester" means a polyester or a polyester co-polymer that has been condensed with one or more branching agents. Preferably, branched polyesters are foamable.

5.2 Foamable Polyesters for Use in the Invention

Although polyesters have excellent chemical and thermal stability and structural properties, foaming is often difficult due to their melt rheology (e.g., low melt strength and low melt viscosity). In some cases, this can be overcome by using special processing equipment. But the more common way to improve polyester foaming characteristics is to alter the melt rheology by pre-treating them with branching agents, for example, polyfunctional carboxylic acids, polyfunctional anhydrides, and polyhydroxyl compounds according to well-known methods.

Preferably, foamable polyester resins in the invention have a crystallinity of from about 5% to about 100%, more preferably, of from about 10% to about 60%, most preferably, of from about 25% to about 45%, and even more preferably, of from about 28% to about 39%, as measured by differential scanning calorimetry.

Preferably, foamable polyester resins have the following melt rheology and properties: (1) a melt strength of from about 1 to about 60 centinewtons, preferably, of from about 5 to about 30 centinewtons; (2) a melt viscosity of from about 30,000 to about 500,000 poises, preferably, of from about 200,000 to about 300,000; and (3) an inherent viscosity of from about 0.5 to about 1.95 dl/g, preferably, of from about 0.7 to about 1.2 dl/g.

5.2.1 Crystallinity

The crystallinity of foamable polyester resins for use in the invention may be measured by differential scanning calorimetry. This involves absorbed-energy measurement as a polyester-resin sample is heated to and beyond its crystalline melting point. The crystallinity is defined as the ratio of the energy absorbed per unit mass to the theoretical heat of fusion. For polyethylene terephthalate resin, the theoretical heat of fusion is 26.9 kJ/g-mole of repeat units, or more conveniently 140 Joules per gram of resin. 3 B. WUNDERLICH, *Crystal Melting*, in MACROMOLECULAR PHYSICS (1980).

As is well known in the art, a differential scanning calorimeter can measure very small quantities of energy that are absorbed or released from a sample material. In a typical procedure, a 5 mg to 10 mg polyester resin sample is sealed in an aluminum pan and placed in the calorimeter's sample cell. Typically, the sample is purged with an inert gas, such as nitrogen to preclude sample oxidation. Then, the sample temperature is ramped, for example, 10° C. per minute while the differential scanning calorimeter measures the energy absorbed or released. The enthalpy of melting or heat of fusion is determined automatically by the differential scanning calorimeter with software that integrates the area under the melting peak. For quality assurance, the foamable polyester's crystallinity should be measured by differential scanning calorimetry prior to foaming. For references relating to differential scanning calorimetry, see Dole et al., 20 J. CHEM. PHYSICS 781 (1952); Wunderlich et al., 24 J. POLYMER SCI. 201 (1957); Quinn et al., 80 J. AM. CHEM. SOC. 3178 (1958); Wunderlich et al., Part 2A J. POLYMER SCI. 987 (1967); Atkinson et al., 65 TRANS. FARADAY SOC. 1764 (1969); Richardson, Part C J. POLYMER SCI. 251 (1972).

5.2.2 Melt Strength

The melt strength may be measured according to the procedure set forth in American Society for Testing and Materials ("ASTM") D3835 *"Standard Test Method for Determination of Properties of Polymeric Materials by Means of a Capillary Rheometer"* measured at 280° C. This test method describes measurement of the rheologic properties of polymeric materials at various temperatures and shear rates common to processing equipment. It covers measurement of melt viscosity, sensitivity, or stability of melt viscosity with respect to temperature and polymer dwell time in the rheometer, die swell ratio (polymer memory), and shear sensitivity when extruding under constant rate or stress. The techniques described permit the characterization of materials that exhibit both stable and unstable melt viscosity properties. Other suitable methods are set forth in U.S. Pat. No. 5,362,763 (issued Nov. 8, 1994); U.S. Pat. No. 6,350,822 (issued Feb. 26, 2002); or U.S. Pat. No. 6,251,319 (issued Jun. 26, 2001) which patents are hereby incorporated by reference herein using, a Rheotens Melt Strength Tester, Type 010.1, supplied by Gottfert Werkstoff-Prufinaschinen GmbH of Buchen, Germany. This test involves drawing an extruded strand of polymer vertically into the nip between two counter-rotating nip rollers using piston rate of 0.2 mm/sec. The strand is extended using a Brabender Plasticorder single screw extruder of screw diameter 19 mm and length to diameter ratio (L/D) of 25. The extruded material exits through a right angle capillary die of length 30 mm and 1 mm diameter at a rate of 0.030 cc/sec to a length of 41.9 mm at 270° C. The strand is then stretched at a constant acceleration while measuring the elongation. The temperature profile used was uniform along the length of the barrel of the extruder and the die and was set at 280° C. The nip rollers are mounted on a balance arm, which allows the force in the drawing strand to be measured. The velocity of the nip rolls is increased at a uniform acceleration rate. As the test proceeds, the force increases until eventually the strand breaks. The force at breakage is termed the "melt strength".

5.2.3 Melt Viscosity

The melt viscosity may be measured according to the procedure set forth in ASTM D4440-01 *"Standard Test Method* for Plastics: Dynamic Mechanical Properties: Melt Rheology", hereby incorporated by reference herein. ASTM test procedures are compiled, reviewed, and published by the American Society for Testing and Materials, which is a voluntary standards development organization operating out of West Conshohocken, Pa. This test method describes the use of dynamic mechanical instrumentation for gathering and reporting the rheologic properties of thermoplastic resins. It may be used as a test method for determining the complex viscosity and significant viscoelastic characteristics of polyester thermoplastics as a function of frequency, strain amplitude, temperature, and time. Rheometric calculations from data obtained by ASTM D4440-01 may be performed according to ASTM D4065-01 "Standard Practice for Plastics: Dynamic Mechanical Properties: Determination and Report of Procedures", hereby incorporated by reference herein. This report recites laboratory practice for determining dynamic mechanical properties of specimens subjected to various oscillatory deformations on a variety of instruments of the type commonly called dynamic mechanical analyzers or dynamic thermomechanical analyzers.

5.2.4 Inherent Viscosity

The inherent viscosity may be measured according to ASTM Test Method D4603-96 "Standard Test Method for Determining Inherent Viscosity of Poly(Ethylene Terephthalate) (PET) by Glass Capillary Viscometer", hereby incorporated by reference herein (see e.g., U.S. Pat. No. 5,422,381, hereby incorporated by reference herein). This test method is for the determination of the inherent viscosity of polyethylene terephthalate soluble at 0.50% concentration in a 60/40 phenol/1,1,2,2-tetrachloroethane solution by means of a glass capillary viscometer. Some highly crystalline forms of polyethylene terephthalate may not be soluble in this solvent mixture and will require a different procedure The inherent viscosity values obtained by this test method are comparable with those obtained using differential viscometry described in ASTM Test Method D5225-98 "Standard Test Method for Measuring Solution Viscosity of Polymers with a Differential Viscometer", hereby incorporated by reference herein.

5.2.5 Polyesters

Polyesters that are foamable or can be converted to foamable polyesters are suitable for use in the invention. Preferably, the polyester is polyethylene terephthalate (PET), polyethylene naphthalate (PEN), or polybutylene terephthalate (PBT), more preferably, polyethylene terephthalate. The polymer's molecular weight is not critical, generally molecular weights of 100,000 D to 1,000,000 D are suitable depending on the polymer type.

Preferred polyesters include, but are not limited to, foamable polyesters derived from reaction of aromatic dicarboxylic acid and a dihydric alcohol, such as those polyesters described in U.S. Pat. No. 5,110,844 (issued May 5, 1992), hereby incorporated by reference herein. Specific examples of preferred foamable polyesters include, but are not limited to, foamable polyethylene terephthalate (PET), foamable polybutylene terephthalate (PBT), foamable polyethylene naphthalate (PEN), foamable copolymers of PET, foamable copolymers of PBT, foamable copolymers of PEN, foamable liquid-crystalline polyesters.

Foamable blends of polyesters and other thermoplastics are also suitable for use in the invention. Suitable blends include foamable polyester/polycarbonate blends as described in U.S. Pat. No. 4,833,174 (issued May 23, 1989) and U.S. Pat. No. 4,462,947 (issued Jul. 31, 1984), both of which are hereby incorporated herein by reference. Suitable blends also include foamable polyester/polyolefin blends as described in U.S. Pat. No. 4,981,631 (issued Jan. 1, 1991) and U.S. Pat. No. 5,128,202 (issued Jul. 7, 1992), both of which are hereby incorporated by reference herein. Suitable polyolefins include, but are not limited to, those listed in column 4, line 33 through column 4, line 35 of U.S. Pat. No. 4,981,631, which disclosure is hereby incorporated by reference herein.

Foamable co-polymers of polyesters and other thermoplastics are also suitable for use in the invention. Suitable polyester co-polymers include, but are not limited to, those listed in column 3, line 3 through column 4, line 41 of U.S. Pat. No. 5,475,037 (issued Dec. 12, 1995), which disclosure is hereby incorporated by reference herein and poly-2-hydroxy-6-naphthoic acid and polynaphthalene terephthalate, which is a copolymer of 2,6-dihydroxynaphthalene and terephthalic acid.

5.2.6 Sources of Foamable Polyesters

Polyesters for use in the invention are readily available commercially or can be synthesized by well-known literature methods, for example see, GEORGE ODIAN, PRINCIPLES OF POLYMERIZATION 97-100 (3d ed. 1991); FRED W. BILLMEYER, JR., TEXTBOOK OF POLYMER SCIENCE 63, 149, 225-227, 434, 452-454(2d ed., 1971), both of which are hereby incorporated herein by reference. In addition, foamable polyethylene terephthalate and other foamable polyesters are available commercially, for example, from Mossi & Ghisolfi Polymers (Houston, Tex.) and Du Pont (Wilmington, Del.).

Suitable procedures for preparing foamable polyesters by condensing polyesters with branching agents are disclosed in U.S. Pat. No. 3,553,157 (issued Jan. 5, 1971), U.S. Pat. No. 4,132,707 (issued Jan. 2, 1979); U.S. Pat. No. 4,145,466 (issued Mar. 20, 1979); U.S. Pat. No. 4,462,947 (issued Jul. 31, 1984); U.S. Pat. No. 4,999,388 (issued Mar. 12, 1991); U.S. Pat. No. 5,000,991 (issued Mar. 19, 1991); U.S. Pat. No. 5,110,844 (issued May 5, 1992); U.S. Pat. No. 5,128,383 (issued Jul. 7, 1992); U.S. Pat. No. 5,134,028 (issued Jul. 28, 1992); U.S. Pat. No. 5,288,764 (issued Feb. 22, 1994); U.S. Pat. No. 5,362,763 (issued Nov. 8, 1994); U.S. Pat. No. 5,422,381 (issued Jun. 6, 1995); U.S. Pat. No. 5,482,977 (issued Jan. 9, 1996); U.S. Pat. No. 5,696,176 (issued Dec. 9, 1997); U.S. Pat. No. 5,229,432 (issued Jul. 20, 1993); and U.S. Pat. No. 6,350,822 (issued Feb. 26, 2002), all of which are hereby incorporated by reference herein.

Suitable polyfunctional carboxylic acid branching agents have three or more carboxylic acid functions per molecule and include, but are not limited to, trimesic acid; pyromellitic acid; benzophenonetetracarboxylic acid; 2,3,6,7-napthalenetetracarboxylic acid; 1,2,5,6-napthalenetetracarboxylic acid; 1,2,3,4-cyclobutanetetracarboxylic acid; tetrahydrofuran-2, 3,4,5-tetracarboxylic acid; 2,2-bis(3,4-dicarboxyphenyl)propane; and 3,3', 4,4'-biphenyltetracarboxylic acid. Such branching agents are commercially available or prepared by well-known methods.

Suitable polyhydroxyl compounds and equivalents (i.e., a compound that can be converted in situ to a polyhydroxy alcohol, e.g., esters of polyhydroxyl compounds) have at least three hydroxyl groups or hydroxyl-group equivalents per molecule and include, but are not limited to, glycerol; trimethylolpropane; trimethylolethane; pentaerythritol, dipentaerythritol, tripentaerythritol, and esters thereof; 1,2,6-hexanetriol; sorbitol; glycerol tripropylate; glycerol tribenzoate; 1,1,4,4-tetrakis(hydroxymethyl)cyclohexane; tris(2-hydroxyethyl)isocyanurate; ethylene oxide; and propylene oxide. Polymers or copolymers having polyhydroxyl groups are also suitable and include, but are not limited to, poly(ethylene-co-vinyl alcohol) and poly(ethylene-co-vinyl acetate). Preferably, the polyhydroxyl compound is pentaerythritol, dipentaerythritol, tripentaerythritol, or an ester thereof; trimethylolpropane; trimethylolethane; glycerol; or any mixture thereof. Such branching agents are commercially available or prepared by well-known methods.

Polyfunctional acid anhydride branching agents are the most preferred class of branching agents for preparing suitable foamable polyesters. Suitable polyfunctional acid anhydride branching agents have at least one anhydride group and one or more additional carboxylic, hydroxyl, or anhydride groups per molecule and include, but not limited to, pyromellitic dianhydride; 1,2,3,4-cyclobutanetetracarboxylic acid dianhydride; benzophenonetetracarboxylic acid dianhydride; diphenylsulfone tetracarboxylic dianhydride; bis(3,4-dicarboxyphenyl)ether dianhydride; bis(3,4-dicarboxyphenyl)thioether dianhydride; bisphenol-A bisether dianhydride; 2,2-bis(3,4-dicarboxyphenyl)hexafluoropropane dianhydride; 2,3,6,7-napthalenetetracarboxylic acid dianhydride; bis(3,4-dicarboxyphenyl)sulfone dianhydride; 1,2,5,6-napthalenetetracarboxylic acid dianhydride; 2,2', 3,3'-biphenyltetracarboxylic acid dianhydride; hydroquinone bisether dianhydride; 3,4,9,10-perylene tetracarboxylic acid dianhydride; tetrahydrofuran-2,3,4,5-tetracarboxylic acid dianhydride; 3,3', 4,4'-biphenyltetracarboxylic acid dianhydride; and 4,4'-oxydiphthalic dianhydride. Polymers or copolymers containing an acid anhydride component are also suitable. Preferred polyfunctional acid anhydride branching agents are pyromellitic dianhydride; 1,2,3,4-cyclopentanetetracarboxylic acid dianhydride; 1,2,3,4-cyclobutanetetracarboxylic acid dianhydride; and tetrahydrofuran-2,3,4,5-tetracarboxylic acid dianhydride, more preferably, pyromellitic dianhydride. The preferred polyfunctional acid anhydride branching agent is pyromellitic dianhydride, which is commercially available, for example, from Aldrich.

Mixtures of polyfunctional carboxylic acids, polyhydroxyl compounds; and/or polyfunctional acid anhydrides, are also suitable branching agents, for example, a mixture comprising a polyhydroxyl alcohol and a polyfunctional acid anhydride.

5.3 Preparation of Core Materials of the Invention

Well-known methods can be used in the initial, multi-stranded foaming process to produce coalesced multi-stranded foamed articles, which are precursors to the unitary core materials of the invention. Such procedures are described in detail in U.S. Pat. No. 3,573,152 (issued Mar. 30, 1971); U.S. Pat. No. 4,122,047 (issued Oct. 24, 1978); U.S. Pat. No. 4,462,947 (issued Jul. 31, 1984); U.S. Pat. No. 4,824,720 (Apr. 25, 1989); U.S. Pat. No. 4,833,174 (issued May 23, 1989); U.S. Pat. No. 4,981,631 (Jan. 1, 1991); U.S. Pat. No. 5,246,976 (issued Sep. 21, 1993); U.S. Pat. No. 5,254,400 (issued Oct. 19, 1993); U.S. Pat. No. 5,340,846 (issued Aug. 23, 1994); U.S. Pat. No. 5,360,829 (Nov. 1, 1994); U.S. Pat. No. 5,362,763 (issued Nov. 8, 1994); U.S. Pat. No. 5,391,582 (issued Feb. 21, 1995); U.S. Pat. No. 5,399,595 (Mar. 21, 1995); U.S. Pat. No. 5,422,381 (issued Jun. 6, 1995); U.S. Pat. No. 5,458,832 (issued Oct. 17, 1995); U.S. Pat. No. 5,527,573 (issued Jun. 18, 1996); U.S. Pat. No. 6,197,233 (Mar. 6, 2001); U.S. Pat. No. 6,213,540 (Apr. 10, 2001); and U.S. Pat. No. 6,350,822 (issued Feb. 26, 2002), all of which are hereby incorporated herein by reference.

5.3.1 Production of Pre-Shaped Core Materials of the Invention

Figure 1:
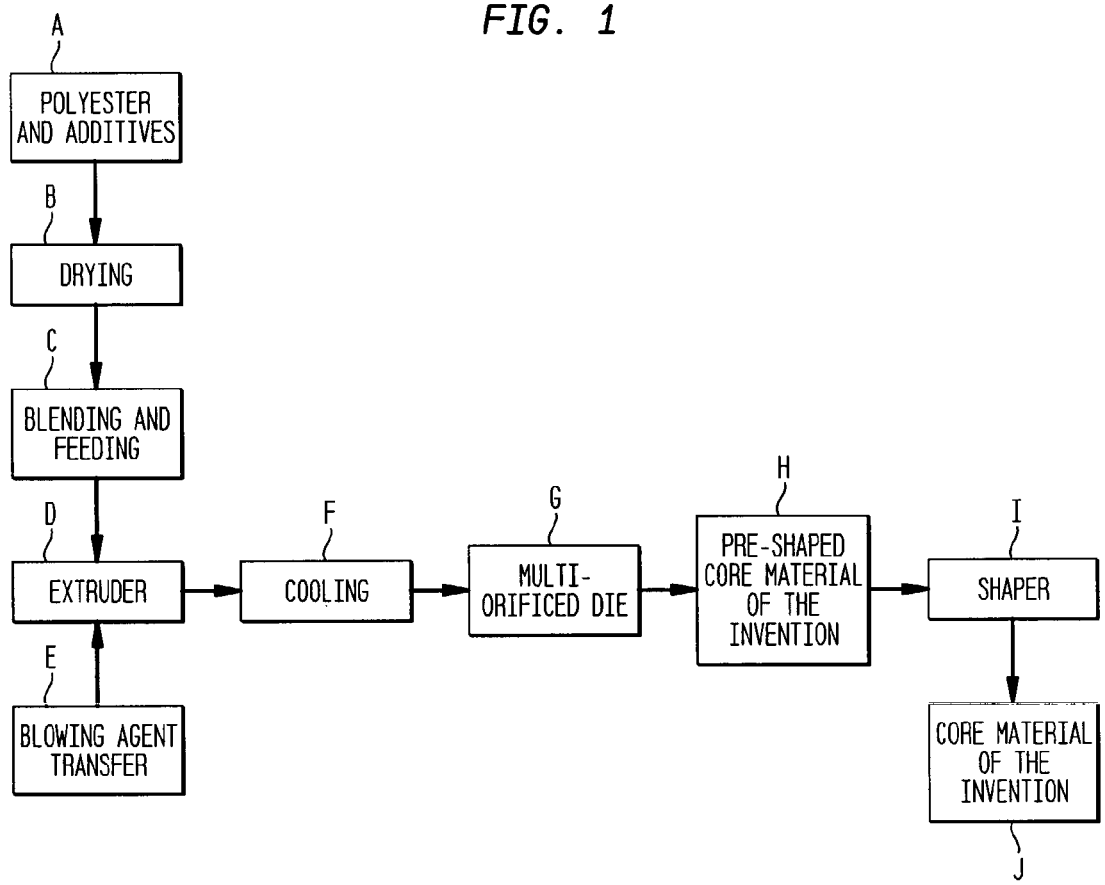
FIG. 1 is a flowchart outlining the general steps that may be used to extrude a foamable polyester gel to obtain a core material of the invention.

A typical process is outlined in FIG. 1. The polyester and additives ("feed mixture") A are dried B, blended C, and fed into an extruder D via the feed section of the extruder screw. The composition of the feed mixture is described in more detail in Section 5.3.3 below. Preferably, an extruder hopper (not shown) is used to funnel feed mixture A into extruder D. Feed mixture A may be blended, according to well-known methods, in a separate blender, in the extruder hopper, or in the extruder itself. Feed mixture A may be dried, according to well-known methods, in a separate drier or in the extruder hopper. The drying step may be omitted, for example, if dry raw materials are used. Extruder D, extruder drying equipment B, and extruder cooling equipment F are well known in the art. Any basic thermoplastic screw-type extruder can be used. Suitable extruders are described in U.S. Pat. No. 3,573,152; (issued Mar. 30, 1972); U.S. Pat. No. 5,340,846 (issued Aug. 23, 1994); U.S. Pat. No. 6,254,977 (issued Jul. 3, 2001); and U.S. Pat. No. 6,350,822 (issued Feb. 26, 2002), all of which patents are hereby incorporated by reference herein. Preferably, extruder D comprises a single-screw, which preferably, has a length to diameter ratio of 44, for example, about 6 cm in diameter and 280 cm in length. Preferably, the extruder has a two-stage foaming screw. Dryer B can be any standard dryer, such as a AEC Whitlock brand dryer (Wood Dale, Ill.) for example, Models WD-25MR and WD-50MR desiccant-bed dryers, which have a capacity of 3.0 and 6.0 cubic feet, respectively. Preferably, cooling apparatus F is located at the end of the extruder barrel to cool the melt such that a melt strength and viscosity suitable for foaming is achieved Once in extruder D, the feed mixture is pressurized (typically at a pressure of from about 25 atmospheres to 200 atmospheres depending on the blowing agent's properties) and melted by heating above the foamable polyester's melting point in the extruder screw. Then one or more blowing agents E are transferred into the extruder, for example, via a liquid injection pump or gas cylinder with injector valves, and blended with the feed mixture under pressure resulting in a polyester/blowing agent mixture ("foamable gel"). Suitable blowing agents are described in more detail in Section 5.3.4 below. The foamable gel is pressurized to prevent blowing-agent evaporation. The foamable gel is cooled and metered by the screw through multi-orifice die plate G. The die plate is described in more detail in Section 5.3.5 below. Optionally, the mixture may be cooled F, for example, in a melt cooler, in a "cooling stage" of the extruder, in a die adapter, or in a secondary extruder. If the foamable gel is too hot or its viscosity too low, upon extrusion, the foam cells will expand too rapidly, leading to cell-wall rupture and foam collapse. If, on the other hand, the foamable gel is too cool, foaming will be suppressed. Parameters, adjustment, and methods for temperature and pressure control at the foaming stage are well known in the art. Die body and multi-orifice die plate G are fastened to the forward end of the extruder barrel or, if a separate cooling unit is used, then at the discharge end of the extruder cooler. Upon exiting the die into ambient pressure, the foamable gel foams as a result of blowing-agent evaporation and expansion. Upon foaming, the strands coalesce to give a coalesced multi-stranded pre-shaped core material H. The extruded strands require time and space to obtain sufficient expansion, which are readily determined by one of skill in the art. The temperature range from die plate to shaper including the foaming land (the "land" region of the die is the smallest diameter of the orifice) should be controlled based on the blowing agent, nucleating agent, melt viscosity, and melt strength and the foam's desired physical characteristics according to well-known methods and parameters.

Figure 2:
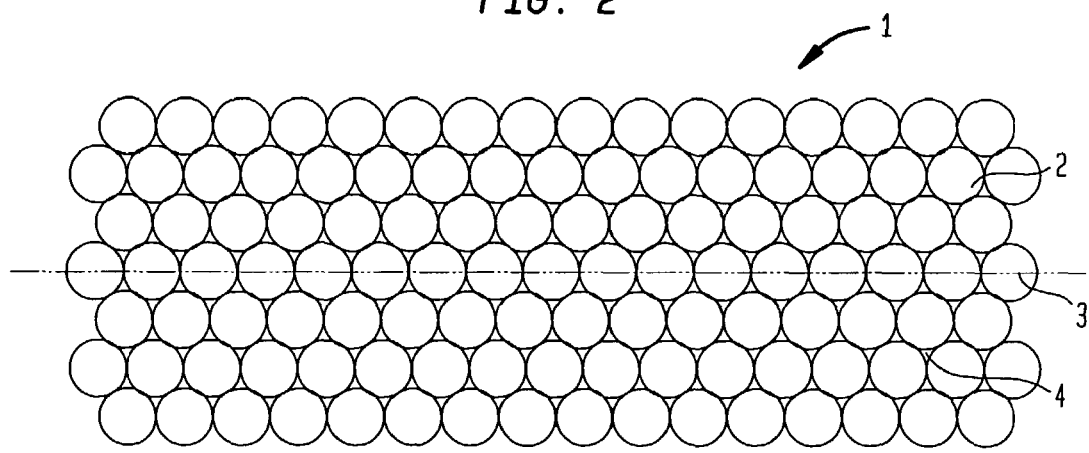
FIG. 2 is a drawing representing a unitary multi-stranded foamed core material of the invention prior to conversion into a core material of the invention by compression shaping to remove the voids between the strands.

FIG. 2 is an illustration of pre-shaped core material's 1 strand pattern 2 prior to shaping. The pre-shaped core material comprises coalesced strands 3 and may comprise inter-strand voids 4 running parallel to the strand direction.

An alternative foaming extrusion process, which is well known in the art, employs tandem extruders. According to this process, the polyester and other components are mixed, melted, pressurized, and homogenized with the blowing agent(s) in a first extruder, as described above, resulting in the foamable gel. The foamable gel is transferred by means of a conventional transfer tube or static mixer, optionally assisted by a gear-type melt pump, to the feed section of the second extruder, which conveys the foamable gel to the die and adjusts the temperature and pressure necessary for optimum foaming. Typically, the two extruders are of different sizes. The well-known tandem-extruder process allows excellent control of process variables. See e.g., JAMES L. THRONE, THERMOPLASTIC FOAMS 191 (1st ed. 1996); K.-D. Kolossow, *Extrusion of Foamed Intermediate Products With Single-Screw Extruders*, in PLASTICS EXTRUSION TECHNOLOGY 456 (F. Hensen ed. 1988), both of which titles are incorporated by reference herein.

5.3.2 Shaping the Extruded Pre-Shaped Core Materials of the Invention

Figure 4:
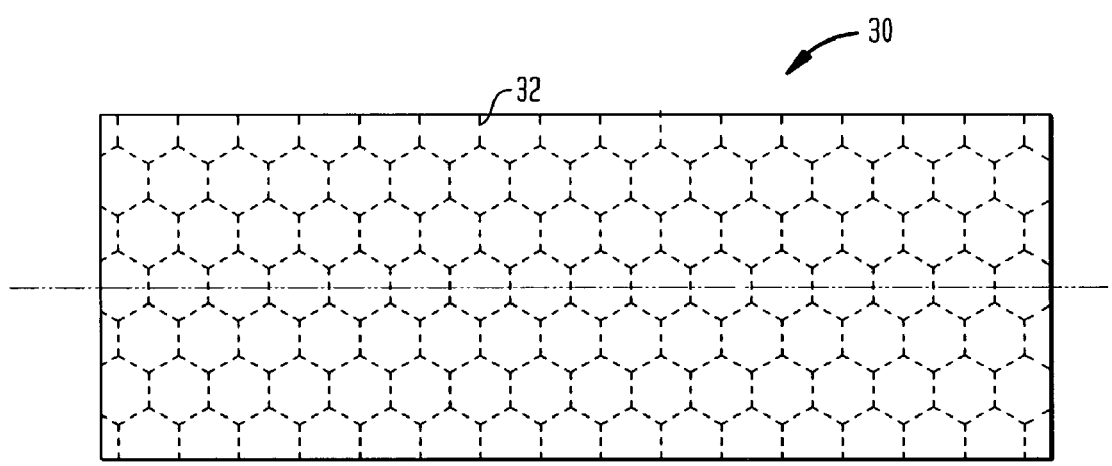
FIG. 4 is a drawing of a cross-sectional view of a core material of the invention.

The special shaping process described below serves three functions: (a) to compress the pre-shaped core material's coalesced strands and eliminate inter-strand voids between and running parallel to the strands; (b) To mold the core material of the invention to the desired shape; and (c) to provide the core material with a smooth surface. The shaper of the invention basically comprises a shaping conduit of specified shape, having an entrance, an exit, and a length, with the conduit's top having a degree of decline, while the angle of the sides and bottom remain straight (i.e., the sides and bottom are fixed in a parallel relationship). As the recently extruded multi-stranded core material is forced or pulled through the shaper, it is compressed. The compression removes the inter-strand voids resulting in the high-strength core materials of the invention (see FIG. 4 showing a cross section of a core material of the invention having no inter-strand voids). The shaping process can be tailored by adjusting the entrance and exit size, length, and the degree of decline to completely remove the strand appearance of the core material. That is, if the core material is cut perpendicular to the strand direction, strands are no longer visible or defined (at least to the human eye). The strands have coalesced to a degree wherein the core material appears to be unitary. But surprisingly, this shaping results in a plurality of discrete volumes. These discrete volumes are distinguished from one another in that each comprises a core having closed cells of average cell size relatively larger than the average cell size of the cells in a surrounding jacket. This phenomenon is believed to contribute to the anisotropic properties of the core materials of the invention and is more fully discussed in Section 5.4.1 below.

In any case, in next step of FIG. 1, the pre-shaped core material H is conveyed to shaper I, for example, via a puller (not shown) or similar machine. Shaper I compresses the pre-shaped core material, to give a core material of the invention J. Shaper I is placed adjacent to die plate G, the distance between the die plate and shaper may be adjusted according to the strength, temperature, and expansion of foaming strands.

Figure 3A:
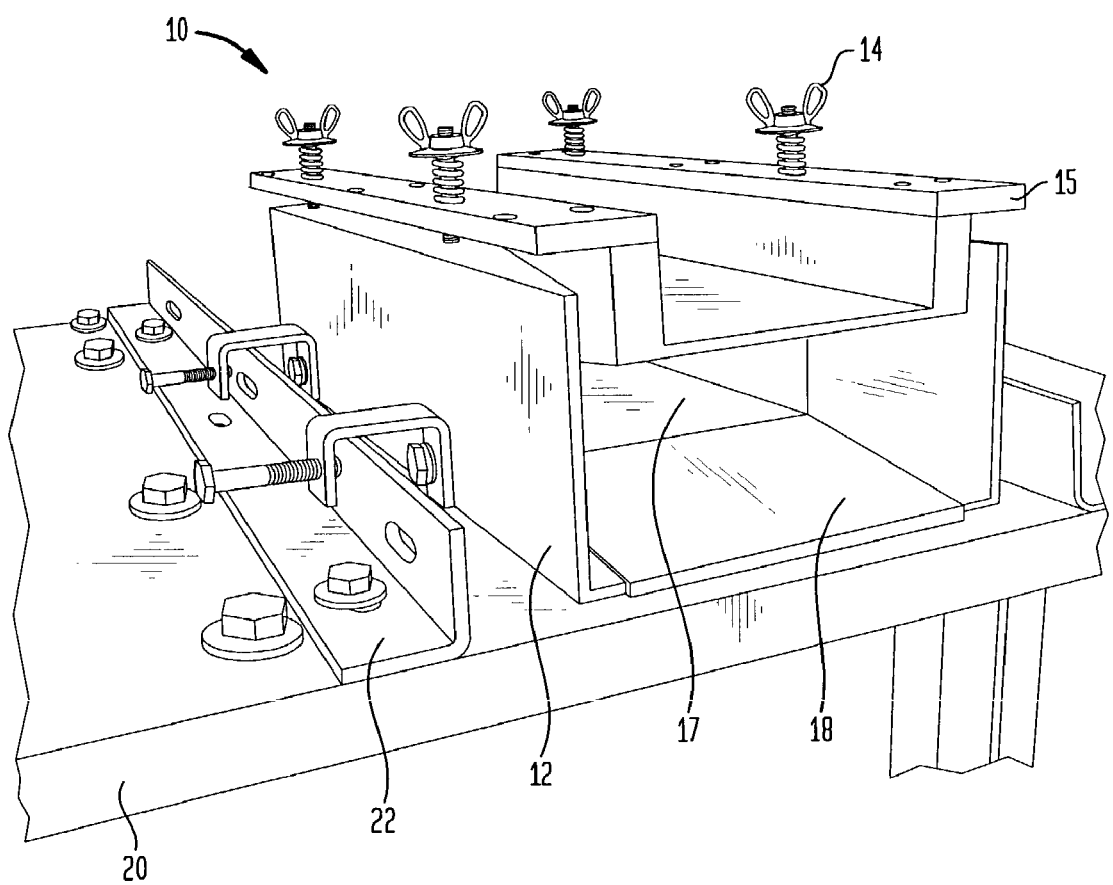
FIGS. 3A to 3C are perspective, side, and front view drawings respectively of a shaper of the invention.
Figure 3B:
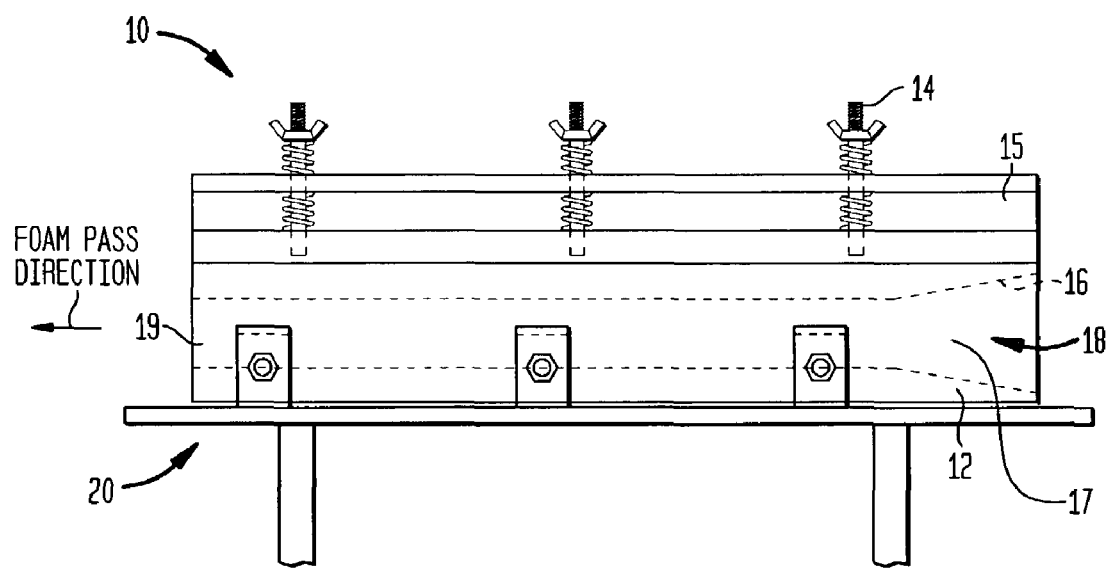
Figure 3C:
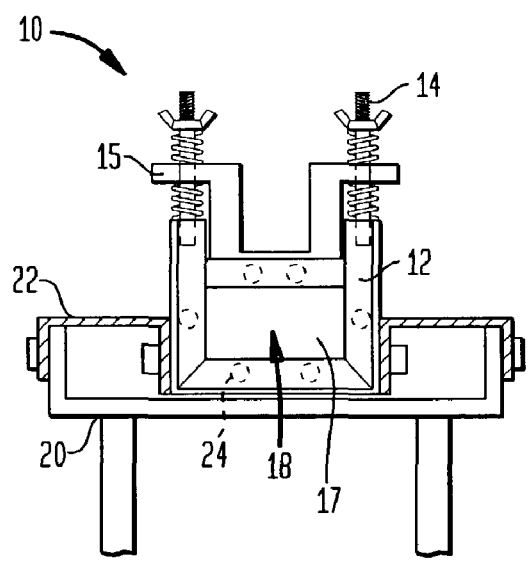

FIGS. 3A and 3C illustrate a shaper 10, suitable for use in the invention. FIG. 3A illustrates a perspective view; a side view is shown in FIG. 3B, and a front view is shown in FIG. 3C. The shaper comprises a fixed channel-shaped bottom 12 connected via a plurality of evenly spaced spring bolts 14 to adjustable top cap 15, having angle of decline 16. As shown in FIG. 3C, top cap 15 is shaped for a close fit into the channel defined by bottom 12 thereby defining shaping conduit 17, having entrance 18 and exit 19. The position of top cap 15 and its angle of decline 16 can be adjusted with spring bolts 14. Upon reading the Specification, one of skill in the art will understand that the parameters of exit size, entrance size, shaping conduit length, and the shaping conduit top's angle of decline depend on the dimensions and pattern of the die plate, the extrusion parameters, blowing agent, polyester resin etc. Preferably, these parameters are adjusted such that all the voids between the strands are substantially removed. Substantially removed means that the inter-strand voids are eliminated to the extent that they are not visible to the human eye or are of diameter smaller than the average cell-size diameter. Preferably, the cross area of entrance 18 is of from about 3.0 times to about 1.2 times the cross area of exit 19, more preferably, of from about 2.5 times to about 1.5 times, even more preferably, of from about 2.0 times to about 1.5 times. The length of the shaper is adjusted based on foam residence times. Thus, shaper length is based on speed of processing, which in turn is dependent on other variables, such as polyester identity, cell size, blowing agent, etc., all of which variables are readily determined and adjusted by one of ordinary skill in the art. Preferably, the length of the shaper is about 1 ft. and the foam has a residence time in the shaper of about 10 to about 30 seconds. Preferably, the angle of decline 16 of the shaping conduit's top 15 is of from about 20° to about 2°, more preferably, of from about 15° to about 5°, even more preferably, of from about 10° to about 5°. Bottom 12 is fixed to support 20, such as a bench, by strips 22. Preferably, strips 22 are constructed of steel.

As shown in FIGS. 3A and 3B, the distance between the top and bottom of shaping conduit 17 gradually decreases while the width remains fixed, thus, when a pre-shaped core material is pulled through shaping conduit 17, it is compressed in a direction perpendicular to its length. The distance between the top and bottom of shaping conduit 17 is controlled by the position of top cap 15. The exterior force required to adjust top cap 15 can be applied by well-known methods, such as gravity, spring-loaded bolts 14, or air pressure from a self-adjusting system. Preferably, shaper 10 is equipped with oil lines 24 parallel to the shaper's length, situated in the lower wall of bottom 12. The oil temperature is adjusted by a heat-exchange system and pumped through lines 24 to control the shaping temperature. One of skill in the art will adjust the shaping temperature considering the identity and dimensions of the foamed strands and the blowing agent's properties. The shaper can be constructed of stainless steel, aluminum, copper, or graphite plates, preferably, aluminum. Preferably, the interior surfaces of shaping conduit 17 are coated with a lubricant or other non-stick coating to reduce the refraction force between the pre-shaped core material and the shaper walls, for example, but not limited to, fluoropolymers (e.g., Lubricating Spray Coating, a product of Saint-Gobain Performance Plastics, Wayne, N.J.).

FIGS. 3A-3C illustrate a shaper of the invention that gives a rectangular core material of the invention. By changing die-plate pattern and the shaper's configuration, different configurations of the core materials of the invention can be achieved, for example, U-channel, I-beam, V, trapezoid, rod, and pipe shapes. The distance from the shaper entrance to the die plate can be adjusted by one of skill in the art depending on the foamable polyester resin, blowing agent(s), and die-plate configuration. Preferably, the shaped core material of the invention has a smooth surface and substantially no voids between the strands.

FIG. 4 illustrates a cross sectional view of a typical core material 30 of the invention after the special shaping process. As indicated in FIG. 4 by the use of dotted lines, the strand interface lines 32 are barely visible, or depending on the extrusion and shaping parameters, not visible at all and no inter-strand voids are present. The shaped core materials of the invention can be cut into desired dimensions by well-known methods.

5.3.3 Feed Mixture, Nucleating Agents and Other Additives

Preferably, the feed mixture comprises foamable polyester and the other additives if they will be used. Preferably, a nucleating agent is included in the feed mixture to promote even evaporation of the blowing agent, thereby controlling the size and number of cells and cell-size distribution. Nucleating agents are well known in the art. Suitable nucleating agents include, but are not limited to, inorganic substances, such as calcium carbonate, talc, clay, titanium oxide, silica, barium sulfate, diatomaceous earth, and carbon dioxide that is generated by including a mixture of a basic salt (e.g., sodium-, potassium-, or ammonium carbonate or bicarbonate) and an inorganic or organic acid (e.g., boric acid, citric acid, and tartaric acid) in the feed material. Finely pulverized inorganic substances, such as calcium carbonate and talc are preferred. The particle size of nucleating agent is from 0.1 to 20 microns, preferably, from 1 to 3 microns. Preferably, the nucleating agent is present in an amount of from about 0.01% to about 5% by weight of polyester, more preferably, of from about 0.1% to about 3% by weight. In general, more nucleating agent gives a smaller average cell diameter. If the amount exceeds 5% by weight, agglomeration or insufficient dispersion of nucleating substance occurs, which results in over-expanded cells and often cell collapse. On the other hand, if the nucleating agent is present in an amount of less than about 0.01% by weight, the nucleating action is negligible.

In another embodiment, the polyester can be non-foamable polyester having one or more branching agents included as an additive to render the polyester foamable in situ. Upon feed-mixture heating and melting, the polyester and branching agent react, in situ, to give foamable polyester, which is extruded as above. Such a process is described in U.S. Pat. No. 5,340,846 (issued Aug. 23, 1994) and U.S. Pat. No. 6,254,977, (issued Jul. 3, 2001) both of which are hereby incorporated by reference herein.

Optionally, the feed mixture may comprise further additives, as well known in the art, depending on the desired properties of the core material. Examples of other additives include, but are not limited to reclaim polymer generated in manufacturing, flame retardants, colorants or pigments, antistatic agents, antioxidants, ultraviolet ray absorbents, and reinforcement by short fibers, etc.

5.3.4 Blowing Agents

The blowing agents suitable for use in the invention generally have a boiling point temperature range of about −90° C. to about 130° C. Suitable blowing agents include, but are not limited to, aliphatic hydrocarbons, such as octane, heptane, hexane, cyclohexane, pentane, cyclopentane, isopentane, neo-pentane, isobutane, butane, propane, and ethane; alcohols, such as methanol, ethanol, isopropanol, and butanol; non-fully chlorinated chlorohydrocarbons, partially or fully fluorinated fluorohydrocarbons, and non-fully halogenated fluorochlorohydrocarbons, such as 1-chloro-1,1-fluoroethane; 1,1,1,2-tetrafluoroethane (HFC 134a); 1,1-difluoroethane (HFC 152a); 1-chloro-1,1-difluoroethane (HCFC 142b); 1,1,1,3,3-pentafluorobutane (HFC-365mfc); 1,1,1,3,3-pentafluoropropane (HFC-245fa); gases, such as carbon dioxide, argon, and nitrogen; and compounds that decompose in situ to release a blowing-agent gas, such as azobisformamide or azodicarbonamide. Preferably, the blowing agent is hexane, carbon dioxide, or 1,1,1,2-tetrafluoroethane or 1,1-difluoroethane.

The amount of blowing agent depends on the desired foam density and such amounts are readily determined by well-known methods, such as those described in U.S. Pat. No. 5,681,865 (issued Oct. 28, 1997), hereby incorporated herein by reference. The amount of blowing agent should not exceed an amount that causes separation between the polyester melt and blowing agent in the extruder, that is exceeds the solubility of said blowing agent in the melt at operating temperatures The preferred amount of blowing agent is of from about 0.5% by weight to about 15% by weight of the feed mixture, more preferably, of from about 1% to about 5%, most preferably, of from about 1% to about 3%. Mixtures of blowing agents can be employed, such as the mixtures described in U.S. Pat. No. 5,679,295 (issued Oct. 21, 1997) according to the procedure described therein, hereby incorporated by reference herein. For example, the following combination of blowing agents could be used: (1) of from about 50 mole percent to about 99.9 mole percent of a first blowing agent having a boiling temperature at STP (Standard Temperature and Pressure) of greater than 310° K, such as heptane, octane, or cyclopentane; (2) of from about 0.1 mole percent to about 50 mole percent of a second blowing agent having a boiling temperature at STP of less than 310° K, such as butane, tetrafluoroethane, carbon dioxide, or pentane.

5.3.5 Die Plate

Foam strands that exit from the orifice generally expand to about 3 to about 6 times the orifice diameter depending on the density, thus the ratio of total orifice cross-sectional area to that of the interior of the die just ahead of the orifice-containing faceplate should be less than 10 percent, more preferably, less than 5 percent.

The die plate comprises a plurality of orifices, in the shape of holes, slits, or any other desired shape, such as square saw tooth or triangular saw tooth wave pattern. The size of the holes can be calculated based on a method described in U.S. Pat. No. 6,197,233 (issued Mar. 6, 2001), hereby incorporated by reference herein. The ratio of the theoretical diameter of an individual strand to the distance between the orifices is, preferably, greater than or equal to 1, more preferably, greater or equal to 1.2. The theoretical diameter of each strand can be calculated based on the foam volume expansion and extrusion-direction speed of the product. The foam volume can be calculated from mass balance and foaming temperature. The orifice size and overall open area are determined also by considering extrude throughput and foaming pressure. The big overall open area can increase throughput and foam cross section area, but reduce the die pressure and cause foaming in die. The only limitation on special arrangement of the die orifices is that contact and coalescence of adjacent strands or profiles after extrusion from the die faceplate must be achieved.

Merely by way of example, a suitable die plate has the following construction: a diameter of orifice is about 1.5 mm, wherein the orifices are arranged in a triangular pattern with a distance of about 6.5 mm between the center of the orifices. In another embodiment, a preferred die-faceplate pattern comprises evenly spaced circular orifices of a diameter of from about 0.8 mm to about 4 mm, preferably, of from about 1.5 mm to about, more preferably, of from about 1 mm to about 2 mm. For example, a suitable die is a circular carbon steel plate of a diameter of 165 mm comprising about 34 equally spaced circular-shaped holes, contained in an area of 7 cm×2 cm, arranged in four rows, wherein the holes are about 0.065 inches (1.65 mm) in diameter and spaced approximately 0.25 inches (6.35 mm) between the centers. In another example, a suitable die is a circular carbon steel plate of a diameter of 165 mm comprising about 34 equally spaced circular-shaped holes, contained in an area of 7 cm×2 cm, arranged in four rows, wherein the holes are about 0.052 inches (1.32 mm) in diameter and spaced approximately 0.25 inches (6.35 mm) between the centers. In yet another example, a suitable die is a circular carbon steel plate of a diameter of 165 mm comprising about 78 equally spaced circular-shaped holes contained in an area of 10 cm×2.5 cm arranged in five rows, wherein the holes are about 0.065 inches (1.62 mm) in diameter and spaced approximately 0.25 inches (6.35 mm) between the centers. Special alloys of more highly conductive metals, such as beryllium-copper, and having heat-transfer fluid passages or electric heaters, would be advantageous in the precise control of temperature of the die faceplate.

5.4 Characteristics of Core Materials of the Invention

Core materials of the invention are chemically and thermally stable by virtue of the polyesters from which they are derived. Furthermore, by virtue of the preparation methods described herein, the core materials of the invention are low-density, relatively small-cell sized, closed-cell foams, of uniform cell size with a low open-cell count. The core materials of the invention are further characterized by excellent mechanical properties, such as high compression strength and compression modulus, high shear strength and shear modulus, and high tensile strength and tensile modulus. Strength refers to the maximum load per unit of area transverse to the loading direction, that the material can resist. Modulus is precise measurement of how much deformation the material will exhibit under a given load. High modulus means that the structure deforms relatively little under large applied forces.

5.4.1 Inter-Strand Cell-Size Distribution

As discussed above, in the shaping process, as the recently extruded multi-stranded core material is forced or pulled through the shaper; it is compressed, thereby removing the inter-strand voids, such that the core materials of the invention appear to be unitary (the strand structure is not visible to the human eye). The properties, however, of the unitary polyester core materials of the invention are much improved over traditional unitary block foams produced by extruding through a single-aperture die or unshaped multi-stranded foams. The origins of these improved properties, such as strength, are not fully understood, but may be due to the change in cell-size distribution that accompanies extrusion and shaping of multi-stranded polyester foams. Upon extrusion and prior to shaping, the core material comprises a multitude of coalesced foamed strands having inter-strand voids running parallel to the strand direction. Upon shaping, the inter-strand voids are removed, and the core materials of the invention often appear unitary, although, in some cases, the strand intersections can be seen.

Surprisingly, however, a plurality of "discrete volumes", running parallel to the length of the core material results. These "discrete volumes" comprise an "interior section" running parallel the strand-direction and a "jacket" surrounding the "interior section of the discrete volume". This interior section has closed cells of average cell size relatively larger than the average cell size of the cells in the surrounding "jacket". In other words, the average-cell diameter is smaller where the strands have intersected and merged than at the original strand's interior. Accordingly, as used herein, the phrase "interior section of the discrete volume" means a section within a core material of the invention running in the strand direction that is surrounded by a "jacket". For example, the "jacket" could be a donut shaped cylindrical volume and the interior section of the discrete volume a cylindrical core inside the cylindrical donut. It follows that the sum value of the volume of the "interior section of the discrete volume" and the volume of the "jacket" equals the "discrete volume", which discrete volume approximates the volume of the corresponding strand before shaping.

Where the interior section of the discrete volume approximates a cylinder shape, such a cylinder has a cross-sectional area of $\pi(x)(\frac{1}{2}d)^2$ where "d" is the diameter of the discrete volume. Preferably "x" is a value of from about 0.99 to about 0.01, more preferably, of from about 0.95 to about 0.5, even more preferably, of from about 0.90 to about 0.75. The volume and shape of the "jacket" surrounding the "interior section of the discrete volume" is the difference between the discrete volume and the volume of the interior section of the discrete volume. Suitable extrapolations can be made by one of skill in the art when the interior section does not approximate a cylinder. Preferably, the average cell diameter of cells in the jacket of the discrete volume is of from about 5% to about 98% of the average cell diameter of cells in the interior section of the discrete volume, more preferably, of from about 20% to about 80%, even more preferably, of from about 30% to about 70%. This inter-strand cell-size distribution can be viewed by any suitable technique, such as optical microscope techniques so as to distinguish cell diameters within the plurality of discrete volumes.

5.4.2 Anisotropic Properties Of Core Materials of the Invention

The core materials of the invention are significantly anisotropic in character; meaning that they exhibit different physical properties depending upon which axis (direction) the property is measured. For example, the core materials of the invention exhibit different shear properties, tensile properties, and compressive properties depending upon the axis along which the property was measured. This character is related to the fact that the core materials of the invention are derived from compressed strands. Although the strand character of the core materials of the invention may not be visible, the anisotropic character is readily apparent through standard testing, for example, testing for differences in shear properties versus applied-force direction, tensile properties versus applied-force direction, and compressive properties versus applied-force direction. For example, in a core material of the invention, the shear strength in the end-strand direction differs from the shear strength in the transverse direction, which both differ from the shear strength in the longitudinal direction.

In core materials of the invention, the shear strength differs, the shear modulus differs, and the shear elongation at break differs depending on the relationship between the applied-force direction and the strand direction. Preferably the shear strength difference ranges from about 10% to about 400% higher in the end-strand over the transverse direction, more preferably, from about 20% to about 200%, even more preferably, from about 40% to about 150%. Preferably, the shear modulus difference ranges from about 10% to about 400% higher in the end-strand over the transverse direction, more preferably, from about 20% to about 200%, even more preferably, from about 40% to about 150%. Preferably the shear elongation at break point difference ranges from about 10% to about 600% higher in the end-strand over the transverse direction, more preferably, from about 20% to about 400% even more preferably, from about 50% to about 200%.

In core materials of the invention, the tensile strength differs and the tensile modulus differs depending on the relationship between the applied-force direction and the strand direction. Preferably the tensile strength difference ranges from about 100% to about 3000% higher in the end-strand over the transverse direction, more preferably, from about 500% to about 2000%, even more preferably, from about 800% to about 1100%. Preferably the tensile modulus difference ranges from about 100% to about 3000% higher in the end-strand over the transverse direction, more preferably, from about 500% to about 2000%, even more preferably, from about 900% to about 1500%.

In core materials of the invention, the compressive strength differs and the compressive modulus differs depending on the relationship between the applied-force direction and the strand direction. Preferably the compressive strength difference ranges from about 50% to about 1000% higher in the end-strand over the transverse direction, more preferably, from about 100% to about 500%, even more preferably, from about 120% to about 300%. Preferably the compression modulus difference ranges from about 10% to about 500% higher in the end-strand over the transverse direction, more preferably, from about 20% to about 200%, even more preferably, from about 30% to about 100%.

5.4.3 Density

The core materials of the invention are characterized by low density, preferably, of from about 1 kg/m$^3$ to about 400 kg/m$^3$, more preferably, of from about 50 kg/m$^3$ to about 300 kg/m$^3$, and most preferably, of from about 60 kg/m$^3$ to about 250 kg/m$^3$ as measured according to ASTM Test Method D1622-98 "*Standard Test Method for Apparent Density of Rigid Cellular Plastics*", hereby incorporated by reference herein. This publication sets forth procedures for the determination of both the apparent overall density and the apparent core density of cellular plastics.

5.4.4 Average Cell Size

The core materials of the invention are characterized by small average cell size, preferably, of from about 0.05 mm to about 1.5 mm, more preferably, of from about 0.1 mm to about 0.5 mm, as measured according to ASTM Test Method D3576-98 "*Standard Test Method for Cell Size of Rigid Cellular Plastics*", hereby incorporated by reference herein. This publication sets forth methods for determination of the apparent cell size of rigid cellular plastics by counting the number of cell-wall intersections in a specified distance. Procedure A requires the preparation of a thin slice, not more than one half the average cell diameter in thickness, that is mechanically stable. For most rigid cellular plastics this limits the test method to materials with an average cell size of at least 0.2 mm. Procedure B is intended for use with materials whose friable nature makes it difficult to obtain a thin slice for viewing.

5.4.5 Open-Cell Content

The core materials of the invention are characterized by a low open-cell content, preferably, of from about 5 to about 20, more preferably, of from about 5 to about 10 as measured according to ASTM Test Method D2856-94 (1998) "*Standard Test Method for Open-Cell Content of Rigid Cellular Plastics by the Air Pycnometer*", hereby incorporated by reference herein. Cellular plastics are composed of the membranes or walls of polymer separating small cavities or cells. These cells may be interconnecting (open cell), non-connecting (closed cell), or any combination of these types. This test method determines numerical values for open cells. It is a porosity determination, measuring the accessible cellular volume of a material. The volume occupied by closed cells is considered to include cell walls. This test method consists of three procedures: procedure A, designed to correct for cells opened during sample preparation, by measuring cell diameter, calculating, and allowing for surface volume; procedure B, designed to correct for cells opened in sample preparation, by cutting and exposing new surface area equal to the surface area of the original sample dimension; and procedure C, which does not correct for cells opened during sample preparation and gives good accuracy on predominantly highly open-celled materials. The accuracy decreases as the closed-cell content increases and as the cell size increases.

5.4.6 Compression Strength and Compression Modulus

High compression strength and medium compression modulus in the strand direction characterize the core materials of the invention. For example, core materials of the invention, preferably, have a compression strength of from about 0.20 Mpa to about 1.5 Mpa, more preferably, of from about 1.0 to about 1.5 Mpa at a density of 80 kg/m$^3$. At a density of 140 kg/m$^3$, preferably, the core materials have a compression strength of from about 0.8 Mpa to about 2.5 Mpa, more preferably, of from about 1.5 Mpa to about 2.5 Mpa. Preferably, core materials of the invention have a compression modulus of from about 10 Mpa to about 30 Mpa, more preferably, of from about 15 Mpa to about 25 Mpa at a density of 80 kg/m$^3$. At a density of 140 kg/m$^3$, preferably, the core materials have a compression modulus of from about 25 Mpa to about 65 Mpa, more preferably, of from about 45 Mpa to about 55 Mpa. Compression properties can be measured according to the procedure set forth in ASTM Test Method C365-00 "*Standard Test Method for Flatwise Compressive Properties of Sandwich Cores*", hereby incorporated by reference herein. This publication describes determination of the compressive strength and modulus of composite cores. These properties are usually determined for design purposes, in a direction normal to the plane of facings as the core would be placed in a structural sandwich construction. The test procedures pertain to compression in this direction in particular, but also can be applied with possible minor variations to determining compressive properties in other directions.

5.4.7 Tensile Strength and Tensile Modulus

The core materials of the invention are characterized by medium tensile strength and high tensile modulus. Tensile strength of the core material provides and indication of its composite's resistance to skin buckling upon edgewise loading. For example, core materials of the invention, preferably, have a tensile strength of from about 0.5 Mpa to about 2.5 Mpa, more preferably, of from about 1 Mpa to about 2 Mpa at a density of 80 kg/m$^3$. At a density of 140 kg/m$^3$, the core materials, preferably, have a tensile strength of from about 1.5 Mpa to about 3.5 Mpa, more preferably, of from about 2 Mpa to about 3 Mpa. Preferably, core materials of the invention have a tensile modulus of from about 50 Mpa to about 200 Mpa, more preferably, of from about 100 Mpa to about 150 Mpa at a density of 80 kg/m$^3$. At a density of 140 kg/m$^3$, the core materials, preferably, have a tensile modulus of from about 100 Mpa to about 300 Mpa, more preferably, of from about 150 Mpa to about 250 Mpa. The tensile strength and modulus can be measured according to the procedure set forth in ASTM Test Method C297-94 *"Standard Test Method for Flatwise Tensile Strength of Sandwich Constructions"*, hereby incorporated by reference herein. This publication illustrates the determination of the core flatwise tension strength, or the bond between core and facings of an assembled sandwich panel. The test consists of subjecting a sandwich construction to a tensile load normal to the plane of the sandwich, such load being transmitted to the sandwich through thick loading blocks bonded to the sandwich facings or directly to the core.

5.4.8 Shear Strength and Shear Modulus

The core materials of the invention are characterized by medium shear strength and high shear modulus. For example, core materials of the invention, preferably, have a shear strength of from about 0.3 MPa to about 1.5 Mpa, more preferably, of from about 0.6 MPa to about 1.2 Mpa at a density of 80 kg/m$^3$. At a density of 140 kg/m$^3$, the core materials, preferably, have a shear strength of from about 0.5 MPa to about 3 Mpa, more preferably, of from about 1 Mpa to about 2 Mpa. Preferably, core materials of the invention have a shear modulus of from about 10 to about 35, more preferably, of from about 20 MPa to about 30 MPa at a density of 80 kg/m$^3$. At a density of 140 kg/m$^3$, the core materials, preferably, have a shear modulus of from about 20 Mpa to about 60 MPa, more preferably, of from about 30 MPa to about 50 Mpa. The shear strength and modulus can be measured according to the procedure set forth in ASTM Test Method C273-00e1 *"Standard Test Method for Shear Properties of Sandwich Core Materials"*. This publication illustrates the determination of shear properties of sandwich construction core materials associated with shear distortion of planes parallel to the facings. It describes determination of shear strength parallel to the plane of the sandwich, and the shear modulus associated with strains in a plane normal to the facings. The test may be conducted on core materials bonded directly to the loading plates or the sandwich facings bonded to the plates.

5.5 Composites of the Invention

Composites of the invention can be prepared according to well-known methods by integrally bonding the core materials of the invention to standard composite skins. Examples of such methods are described in U.S. Pat. No. 6,206,669 (issued Mar. 27, 2001); U.S. Pat. No. 6,156,146 (issued Dec. 5, 2000); U.S. Pat. No. 6,117,519 (issued Sep. 12, 2000); U.S. Pat. No. 6,013,213 (issued Jan. 11, 2000); U.S. Pat. No. 5,916,672 (issued Jun. 29, 1999); U.S. Pat. No. 5,904,972 (issued May 18, 1999); U.S. Pat. No. 5,580,502 (issued Dec. 3, 1996); and U.S. Pat. No. 5,316,462 (May 31, 1994), all of which are hereby incorporated by reference herein. Just about any composite skin suitable for use with thermoplastic foam cores can be used. Such composite skins are commercially available, for example, from M. C. Gill (El Monte, Calif.), DFI Pultrude Composites, Inc. (Erlanger, Ky.); and Gordon Plastics (Montrose, Calif.). Examples of suitable composite skins include, but are not limited to, thermoplastic polymers and thermosetting polymers, optionally reinforced with glass fibers, metallic fibers, inorganic fibers, or carbon fibers; wood; inorganic materials, such as fiberglass; and metallic materials, such as aluminum and stainless steel and many others, which are well known to those of skill in the art. The composites can be built up in layers. When building composites in layers one or more structural skins can comprise another structural sandwich composite.

A preferred composite-manufacture method is resin infusion molding, which comprises vacuum suction to pull liquid resin into a dry lay up (composite skins and core materials) with almost no hazardous-vapor emissions. The chemically and thermally resistant core materials of the invention are especially suited to such processing.

In some applications where it is necessary that the core of the laminate be conformed to a curved surface, such as a boat hull or a cylindrical storage tank, the core materials of the invention can be processed into a contourable blankets or web-like structures, wherein the core material of the invention is divided into an array of smaller blocks or tiles. Such a blanket may be adhered to a fabric scrim or common carrier whereby the blanket can be conformed to a contoured surface. A process for producing contourable blankets from foamed articles is disclosed in U.S. Pat. No. 5,798,160 (issued Aug. 25, 1998), hereby incorporated herein by reference. The contourable blanket structures are thereafter bonded to skins to form contoured composite materials of the invention.

To produce contourable core materials of the invention, several standard slabs are stacked and bonded together by thermal fusion or by a suitable adhesive to create a large multi-slab block. The block is then sliced transversely in parallel planes normal to the lines of adhesive to yield a plurality of panels. A saw can be used for slicing. Each panel is composed of a series of interconnected foam-plastic sections derived from respective slabs of the block whereby the density of the sections is evenly distributed throughout the panel and the mechanical properties of the panel are therefore predictable and satisfy structural laminate criteria.

In the basic process for producing composite materials of the invention, the core materials of the invention (in rigid, contourable-blanket form, or any other form) and skins are laid up in a tool while dry then a vacuum bag is placed over the lay up and sealed to the tool. Resin is introduced via a resin inlet and distributed throughout the laminate. The pressure differential provides the driving force for infusing the resin into the lay up. The procedure is described in detail in U.S. Pat. No. 4,902,215 (issued Feb. 20, 1990); U.S. Pat. No. 5,052,906 (issued Oct. 1, 1991); U.S. Pat. No. 5,721,034 (issued Feb. 24, 198); U.S. Pat. No. 5,904,972 (issued May 18, 1999); U.S. Pat. No. 5,958,325 (issued Sep. 28, 1999); and U.S. Pat. No. 6,159,414 (issued Dec. 12, 2000), all of which are hereby incorporated herein by reference. Vacuum-bag lay-up products are commercially available, for example, from Airtech International (Carson, Calif.); Hawkeye Enterprises (Los Angeles, Calif.); National Aerospace Supply Co. (San Elemente, Calif.); Richmond Aircraft Supply (Norwalk, Calif.) and Taconic, Process Materials Division (Santa Maria, Calif.). Resins for bonding the skins to the core materials of the invention are commercially available, for example, from Aircraft Spruce & Specialty Company (Corona, Calif.); CMI/Composite Materials Inc. (Santa Fe Springs); E. V. Roberts (Culver City, Calif.); Gougen Brothers, Inc. (Bay City, Mich.); and National Aerospace Supply Co. (San Elemente, Calif.).

6. EXAMPLES

6.1 Example 1

A mixture of polyethylene terephthalate resin (COBI-FOAM 0, purchased from M&G Polymers, Patrica, Italy) having an intrinsic viscosity of 1.25 dl/g; and a melting point of 251° C. and nucleating agent was dried for 5 hours at 330° F. (165° C.) by a dehumidified dryer. The mixture was charged into a two-stage extruder having a 2.5" (6.35 cm) single-screw, length to diameter of 44 to 1, with a SMR melt cooler heated to a temperature of 280° C.; and pressurized to 10 Mpa, a polyethylene terephthalate melt. Blowing agent (3 weight percent of the total weight of the melt) was injected by a injection pump and the mixture homogenized in the extruder by mixing section, static mixer and SMR melt cooler to give a foamable gel. The temperature was reduced to 250-255° C. at a pressure of 3.5-5.0 Mpa and the foamable gel was extruded through a rectangular multi-orifice die plate that was fastened on the die body, which the other end of the die body was attached to the melt cooler. The extrusion rate was 20 kg/hr. The die plate was 7.0 cm×2.0 cm and comprised 34 equally spaced circular-shaped holes arranged in four rows. The holes were approximately 0.065 inches (1.65 mm) in diameter and spaced approximately 0.25 inches (6.35 mm) between the centers.

The following parameter values were used in the extrusion.

| Parameter | Value |
| --- | --- |
| diameter of screw | 6.35 cm |
| screw-length to diameter | 44:1 |
| temperature of melting zone | 280° C. |
| temperature of injection zone | 280° C. |
| temperature of cooling zone | 270-275° C. |
| head temperature | 255-260° C. |
| temperature of the melt | 255-260° C. |
| pressure of the melt | 3.5-5.0 Mpa |
| runs of the screw | 15 rpm |
| average residence time in the extruder | 15 min |

The resulting coalesced multi-stranded pre-shaped core material was conveyed through a shaper of the invention, constructed of aluminum plate, having a width of 7 cm and a length of 30 cm. The ratio of the opening area to the parallel cross-sectional area was 2.3. The first 2.5 cm range of shaper has a 12° angle of decline so that the expanded strands can be squeezed and compressed into foam board without voids between strands. The distance of the cap plate to the bottom of shaper was adjusted from 3 cm to 4 cm based on output of extrusion and speed of take off equipment.

The resulting core material of the invention had a cross section of 7 cm by 3.4 cm; uniform cell size (<0.2 mm); no voids between the strands; and a foam density of 5.4 pcf (86.5 kg/m³) pounds per cubic foot. The core material so produced had the following characteristics:

| Characteristic | Value |
| --- | --- |
| Density | 86.5 kg/m³ |
| Average cell size | 0.1 mm |
| Open-cell content | <10% |

6.2 Example 2

The procedure of Example 1 was followed using 4 weight percent blowing agent and a die plate of 7.0 cm×2.0 cm comprising 34 holes each of 0.052 inches (1.32 mm) in diameter. The holes and rows were equally spaced at approximately 0.25 inches (6.35 mm) between the centers. The coalesced multi-stranded pre-shaped core material was shaped as described in Example 1. The resulting core material of the invention had a cross section of 2.75 inches (7.0 cm) by 1.45 inches (3.68 cm); uniform cell size (<0.3 mm); no voids between the strands; and a foam density of 4.7 pounds per cubic foot (75 kg/m³). The core material so produced had the following characteristics:

| Characteristic | Value |
| --- | --- |
| Density | 75 kg/m3 |
| Average cell size | 0.2 mm |
| Open-cell content | <10% |

6.3 Example 3

The procedure of Example 1 was followed, with 0.15 weight percent talc as a nucleating agent and 2 weight percent blowing agent. The resulting core material of the invention had a cross-section of 7.0 cm by 3.18 cm; a uniform cell size (<0.2 mm); no voids between the strands; and a foam density of 7.56 pounds per cubic foot (121 kg/m³). The core material so produced had the following characteristics:

| Characteristic | Value |
| --- | --- |
| Density | 121 kg/m³ |
| Average cell size | 0.1 mm |
| Open-cell content | <10% |

6.4 Example 4

Using the procedure of Example 1, a foamable gel comprising a mixture of polyethylene terephthalate polyester resin (CRYSTAR 5067, available from Du Pont Polyester) having a melting point of 251° C. and 1.5 weight percent 1,1,1,2-tetrafluoroethane (HFC R134a) as a blowing agent was cooled to a temperature of 255° C. and extruded through the die plate. The SMR melt cooler was not used. The die plate was connected directly to the end of extruder; was 10 cm×2.5 cm; and comprised 78 equally spaced circular-shaped holes arranged in five rows. The holes were about 0.065 inches (1.65 mm) in diameter and spaced about 0.25 inches (6.35 mm) between their centers.

The resulting coalesced multi-stranded pre-shaped core material was conveyed through an aluminum-plate shaper of the invention having a width of 11 cm and a length of 30 cm.

The ratio of the opening area to the parallel cross-sectional area was 1.6. The first 2.5 cm range of shaper has a 12° angle of decline so that the expanded strands can be squeezed and compressed into foam plank without voids between strands. The distance of the cap plate to the bottom of shaper was adjusted from 3 cm to 4 cm based on output of extrusion and speed of take off equipment.

The resulting core material of the invention had a cross section of 4.4 inches (11.2 cm) by 1.35 inches (3.4 cm), a uniform cell size (<0.01 mm), and no voids between the strands. The density was 9.5 pounds per cubic foot (152 kg/m$^3$). The core material so produced had the following characteristics:

| Characteristic | Value |
| --- | --- |
| Density | 152 kg/m$^3$ |
| Average cell size | 0.3 mm |
| Open-cell content | <20% |

6.5 Example 5

A mixture of polyethylene terephthalate resin (COBIFOAM 0, purchased from M&G Polymers, Patrica, Italy) having an intrinsic viscosity of 1.25 dl/g and a melting point of 251° C. and talc powder 0.3 weight %, was dried for 6 hours at 165° C. by a dehumidified dryer. The mixture was charged into a co-rotating twin-screw extruder, model BC 132 PET-F (BC Foam, Volpiano, Italy) equipped with a melt cooler and homogenizer. The extruder screw was 13.2 cm in diameter and 220 cm in length. The mixture was heated in the extruder to a temperature of 285° C. and pressurized to 5 Mpa, then 1,1-difluoroethane (R 152 A) (1.4 weight percent of the total weight of the melt) was introduced via an injection pump. The mixture was homogenized to give a foamable gel. The temperature of the foamable gel was reduced to about 250-255° C. and the pressure was adjusted to about 3.5-4.0 Mpa. The foamable gel was extruded at a rate of 180 kg/hr through a multi-orifice die plate of 42 cm×5 cm comprising 580 equally spaced circular-shaped holes arranged in eight rows. The holes were approximately 1.65 mm in diameter and spaced approximately 6.35 mm between centers.

The following parameter values were used in the extrusion:

| Parameter | Value |
| --- | --- |
| diameter of screw | 13.2 cm |
| screw-length | 220 cm |
| temperature of melting zone | 285° C. |
| temperature of injection zone | 285° C. |
| temperature of cooling zone | 265-270° C. |
| head temperature | 250-255° C. |
| temperature of the melt | 250-255° C. |
| pressure of the melt | 3.5-4.0 Mpa |
| runs of the screw | 15 rpm |
| average residence time in the extruder | 15 min |

The resulting coalesced multi-stranded pre-shaped core material was conveyed through an aluminum-plate shaper of the invention having a width of 43 cm and a length of 30 cm. The ratio of the opening area to the parallel cross-sectional area was 1.6. The first 2.5 cm range of shaper has a 12° angle of decline so that the expanded strands can be squeezed and compressed to remove inter-strand voids. The distance of the cap plate to the bottom of shaper was adjusted from 5 cm to 6 cm based on output of extrusion and speed of take off equipment.

The resulting core material of the invention has a cross section of 42 cm by 5.7 cm; uniform cell size (<0.2 mm); no voids between the strands; and a foam density of 135 kg/m$^3$. The core material so produced had the following characteristics:

| Characteristic | Value |
| --- | --- |
| Density | 135 kg/m$^3$ |
| Average cell size | 0.2 mm |
| Open-cell content | <10% |

6.6 Example 6

The procedure of Example 5 above was followed using 0.5 weight percent nitrogen as blowing agent. The resulting core material of the invention had a cross section of 40 cm by 3.80 cm; uniform cell size (<0.1 mm); no voids between the strands; and a foam density of 350-400 kg/m$^3$.

The core material so produced had the following characteristics:

| Characteristic | Value |
| --- | --- |
| Density | 350-400 kg/m$^3$ |
| Average cell size | <0.1 mm |
| Open-cell content | <10% |

6.7 Example 7

The procedure of Example 1 was followed except that: (1) the shaping process and shaper of Example 4 was used; (2) 0.3 weight percent talc was included in the foamable gel as a nucleating agent; and (3) 0.9 weight percent $CO_2$ was included in the foamable gel as the blowing agent. The resulting core material of the invention had a cross-section of 420 cm×2.3 cm, a uniform cell size (<0.2 mm); no voids between the strands; and a foam density of 125 kg/m$^3$. The core material so produced had the following characteristics:

| Characteristic | Value |
| --- | --- |
| Density | 125 kg/m$^3$ |
| Average cell size | 0.2 mm |
| Open-cell content | <10% |

6.8 Example 8

Anisotropic Properties of Core

Materials of the Invention

This Example demonstrates the pronounced anisotropic properties of core materials of the invention. Samples were selected from a density range of about 80 kg/m$^3$ to about 150 kg/m$^3$. The PET core materials of the invention were prepared according to Example 1 and had an average cell size 0.1 mm and an open-cell content <10%. Test samples were prepared by binding core materials of the invention (7 cm by 3.5 cm planks) into a block then cutting ½" panels in the grain direction according to the procedure set forth in U.S. Pat. No. 4,536,427 (issued Aug. 20, 1985), hereby incorporated by reference herein. The test samples were cut from the block as end-strand panels or as flat-strand panel as appropriate depending on whether the test would be performed by applying force in the end-strand, transverse, or longitudinal directions.

6.8.1 Shear Tests

The shear tests were conducted according to the procedure set forth in ASTM C-273 as discussed in Section 5.4.8 above. The results are shown in FIGS. 5-7, which are respectively graphs of: shear strength versus density (FIG. 5); shear modulus versus density (FIG. 6); and shear elongation at break versus density (FIG. 7). The shear tests were conducted in the end-strand direction (represented by a "♦" in FIGS. 5-7), transverse direction (represented by a "■"), and longitudinal direction (represented by a "Δ") respectively.

FIG. 5 shows that the shear strength of core materials of the invention differs depending on the relationship between the applied-force direction and the strand direction. The most evident difference is between shear strength in the end-strand direction versus shear strength in the transverse direction. As shown in FIG. 5, the shear strength difference ranges from about 60% higher in the end-strand over the transverse direction at lower densities to about 130% higher in the end strand over the transverse direction at higher densities.

FIG. 6 shows that the shear modulus of core materials of the invention differs depending on the relationship between the applied-force direction and the strand direction. The most evident difference is between shear modulus in the end-strand direction versus shear modulus in the transverse direction. As shown in FIG. 6, the shear modulus in the end-strand direction is roughly 100% greater than that in the transverse direction over the density range.

FIG. 7 shows that the shear elongation at break point of core materials of the invention differs depending on the relationship between the applied-force direction and the strand direction. The most evident difference is between shear elongation at break point in the end strand direction versus shear elongation at break point in the longitudinal direction. As shown in FIG. 7, the shear-elongation-at-break-point in the end-strand direction is roughly 170% greater than in the longitudinal direction over the density range.

6.8.2 Tensile Properties

The tensile tests were conducted according to the procedure set forth in ASTM C297-94 as discussed in Section 5.4.7 above. The results are shown in FIGS. 8-9, which are respectively graphs of tensile strength versus density (FIG. 8) and tensile modulus versus density (FIG. 9). The tensile tests were conducted in the end-strand direction (represented by a "♦") and the transverse direction (represented by a "■") respectively.

FIG. 8 shows that the tensile strength of core materials of the invention differs depending on the relationship between the applied-force direction and the strand direction. As shown, the tensile strength in the end-strand direction is roughly 900% greater than that in the transverse direction over the density range.

FIG. 9 further shows that the tensile modulus in the end-strand direction is roughly 1100% greater than that in the transverse direction over the density range.

6.8.3 Compression Properties

The compression tests were conducted according to the procedure set forth in ASTM C365-00 as discussed in Section 5.4.6 above. The results are shown in FIGS. 10-11, which are respectively graphs of compression strength versus density (FIG. 10) and compression modulus versus density (FIG. 11). The compression tests were conducted in the end-strand direction (represented by a "♦") and the transverse direction (represented by a "■").

FIG. 10 shows that the compression strength of core materials of the invention differs depending on the relationship between the applied-force direction and the strand direction. As shown, the compression strength in the end-strand direction is roughly 400% greater than that in the transverse direction over the density range.

FIG. 11 further shows that the compression modulus in the end-strand direction is roughly 50% greater than that in the transverse direction over the density range, with a more pronounced effect at higher densities.

In sum, this example demonstrates that the core materials of the invention are significantly anisotropic in character.

6.9 Example 9

Improved Properties of Core Materials of the Invention Over Standard Pet Foam Boards Produced by Extruding Foamable Pet Through a Conventional, Rectangular Slot Die This Example compares the shear properties of PET core materials of the invention against those of standard PET foam boards produced by extruding foamable PET through a conventional, rectangular slot die ("conventional PET foam boards"). The shear properties of the PET core materials of the invention were tested in the longitudinal direction.

The conventional foam boards and core materials of the invention used in this Example ranged in density from about 80 kg/m$^3$ to about 215 kg/m$^3$. Test sample of core materials of the invention were prepared as in Example 8 (6"×2.5"×0.5"), and the conventional PET foam boards (also 6"×2.5"×0.5") can be obtained from M&G Polymers, Patrica, Italy. Both the conventional foam boards and the core materials of the invention had an average cell size of about 0.1 mm and an open-cell content of about <10%. The shear tests were conducted according to the procedure set forth in ASTM C-273 as discussed in Section 5.4.8 above.

The results are shown in FIGS. 12-14, which are respectively graphs of shear strength versus density (FIG. 12); shear modulus versus density (FIG. 13); and shear elongation at break versus density (FIG. 14). The core materials of the invention are represented by "■" and the conventional foam boards are represented by "♦".

These graphs show: (1) that the shear strength of the PET core materials of the invention are about 50% higher than that of conventional foam boards over the entire density range; (2) the core materials of the invention have a higher shear modulus by about 25%-85% over that of the conventional foam boards over the density range; and (3) the shear elongation at break of core materials of the invention is about 100%-200% higher than that of the conventional foam boards over the density range. This Example illustrates that the core materials of the invention are far superior to conventional foam boards comprising the same composition.

Although the present invention has been described in considerable detail with reference to certain preferred embodiments and versions, other versions and embodiments are possible. Therefore, the spirit and scope of the appended claims should not be limited to the description of the versions and embodiments expressly disclosed herein. The references discussed in Background Section 2 are not admitted to be prior art with respect to the invention.

What is claimed is:

1. A structural sandwich composite comprising:
   a block of core material bonded to one or more structural skins, said skin made from a material selected from the group consisting of thermosetting polymer, thermoplastic polymer reinforced with glass fibers, metallic fibers, inorganic fibers, or carbon fibers; thermosetting polymer reinforced with glass fibers, metallic fibers, inorganic fibers, or carbon fibers; wood; fiberglass; and metal;
   said core material comprising a plurality of foamed polyester strands rigidly bound to one another with substantially no inter-strand voids between the strands, and formed by extrusion through a multi-orifice die, said strands defining a plurality of discrete volumes, each discrete volume comprising an interior section and a corresponding jacket, wherein the average cell size in the interior section is larger than the average cell size in the jacket.

2. The structural sandwich composite of claim 1, wherein the core material is anisotropic.

3. The structural sandwich composite of claim 1, wherein the block is bonded between two structural skins.

4. The structural sandwich composite of claim 3, further comprising a resin bond between the block and the structural skin.

5. The structural sandwich composite of claim 1, wherein the foamed polyester core material is foamable polyethylene terephthalate, foamable polybutylene terephthalate, foamable polyethylene naphthalate, foamable copolymer of polyethylene terephthalate, a foamable copolymer of polybutylene terephthalate, a foamable copolymer of polyethylene naphthalate, or a mixture thereof.

6. The structural sandwich composite of claim 1, wherein the foamed polyester core material is formable polyethylene terephthalate.

7. The structural sandwich composite of claim 1, wherein the core material further comprises a nucleating agent, a fire retardant, or a reinforcing agent.

8. The structural sandwich composite according to claim 1, wherein the block of core materials is an end-strand panel bonded to one or more structural skins.

9. The structural sandwich composite according to claim 1, wherein the block of core materials are oriented in a flat-strand panel and bonded to one or more structural skins.

10. The structural sandwich composite according to claim 1, wherein the core materials are chemically or thermally bound to one another to form the block.

* * * * *